US009736554B2

(12) United States Patent
Hershberger et al.

(10) Patent No.: US 9,736,554 B2
(45) Date of Patent: Aug. 15, 2017

(54) DRAFT BEER SUPPLY CHAIN SYSTEMS AND METHODS

(71) Applicant: SteadyServ Technologies, LLC, Fishers, IN (US)

(72) Inventors: Steve Hershberger, Carmel, IN (US); Steve Kremer, Carmel, IN (US); Matt Mayer, Westfield, IN (US); Mark Kosiarek, Fishers, IN (US)

(73) Assignee: STEADYSERV TECHNOLOGIES, LLC, Fishers, IN (US)

( * ) Notice: Subject to any disclaimer, the term of this patent is extended or adjusted under 35 U.S.C. 154(b) by 0 days.

(21) Appl. No.: 15/339,545

(22) Filed: Oct. 31, 2016

(65) Prior Publication Data

US 2017/0048599 A1 Feb. 16, 2017

Related U.S. Application Data

(63) Continuation of application No. 14/402,844, filed as application No. PCT/US2013/042725 on May 24, (Continued)

(51) Int. Cl.
*G08B 23/00* (2006.01)
*H04Q 9/00* (2006.01)
(Continued)

(52) U.S. Cl.
CPC ............ *H04Q 9/00* (2013.01); *B67D 1/0801* (2013.01); *B67D 1/0878* (2013.01);
(Continued)

(58) Field of Classification Search
CPC ... B67D 1/0829; B67D 1/0878; B67D 1/0888
See application file for complete search history.

(56) References Cited

U.S. PATENT DOCUMENTS

| 4,869,396 A | 9/1989 | Horino et al. |
| 4,997,012 A | 3/1991 | Kuziw |

(Continued)

FOREIGN PATENT DOCUMENTS

| CN | 2893668 Y | 4/2007 |
| CN | 201043914 | 4/2008 |

(Continued)

OTHER PUBLICATIONS

International Preliminary Report on Patentability, PCT/US2013/042725, mailed Dec. 4, 2014, pp. all.

(Continued)

*Primary Examiner* — Omeed Alizada
(74) *Attorney, Agent, or Firm* — Dorsey & Whitney LLP

(57) ABSTRACT

Supply chain systems and methods are disclosed for monitoring fluid levels in liquid containers, such as kegs. Embodiments include sensors that fit within a keg's false bottom, measure the weight of the keg, and transmit the weight information to a computer database via a wireless network. Other embodiments include an RFID device with information about a characteristic of the liquid within a keg (such as brand and/or type of beer) that may be attached to the keg and paired with the sensor so the sensor can transmit information about the characteristic of the liquid in the keg. In alternate embodiments, the sensor's transmitter is short range and an uplink/gateway is used to receive information from the sensor and relay that sensor's information to a broader wireless network. Multiple containers in close proximity may each be fitted with an RFID device and sensor and communicate their individual information to the database.

17 Claims, 23 Drawing Sheets

Related U.S. Application Data 2013, now Pat. No. 9,485,549, and a continuation of application No. 13/837,639, filed on Mar. 15, 2013, now Pat. No. 9,221,667.

(60) Provisional application No. 61/651,531, filed on May 24, 2013.

(51) Int. Cl.
    *G01D 4/00* (2006.01)
    *G06Q 10/08* (2012.01)
    *B67D 1/08* (2006.01)
    *G01G 19/00* (2006.01)
    *G06Q 30/06* (2012.01)
    *H04B 5/00* (2006.01)
    *H04W 4/00* (2009.01)

(52) U.S. Cl.
    CPC ............ *B67D 1/0888* (2013.01); *G01D 4/002* (2013.01); *G01G 19/00* (2013.01); *G06Q 10/08* (2013.01); *G06Q 10/087* (2013.01); *G06Q 30/0633* (2013.01); *H04B 5/0031* (2013.01); *H04W 4/006* (2013.01); *H04W 4/008* (2013.01); *B67D 2001/0811* (2013.01); *H04Q 2209/47* (2013.01); *Y10T 137/8342* (2015.04)

(56) References Cited

U.S. PATENT DOCUMENTS

| | | | |
|---|---|---|---|
| D327,604 S | 7/1992 | Culverson | |
| D331,349 S | 12/1992 | Culverson | |
| 5,614,278 A | 3/1997 | Chamberlain et al. | |
| 5,986,219 A | 11/1999 | Carroll et al. | |
| 6,546,795 B1 | 4/2003 | Dietz | |
| 6,580,357 B1 | 6/2003 | Forster et al. | |
| 6,847,912 B2 | 1/2005 | Forster | |
| 6,938,488 B2 | 9/2005 | Diaz et al. | |
| 7,107,836 B2 | 9/2006 | Brookner | |
| 7,255,003 B2 | 8/2007 | Schneiter | |
| 7,458,260 B2 | 12/2008 | Roesner | |
| 7,471,208 B1 | 12/2008 | Hoben et al. | |
| 7,565,240 B2 | 7/2009 | Tomizawa | |
| 7,814,786 B2 | 10/2010 | Woodard | |
| 7,821,410 B2 | 10/2010 | Higashionji et al. | |
| 7,855,637 B2 | 12/2010 | Forster | |
| 8,241,918 B2 | 8/2012 | Bertram et al. | |
| 9,221,667 B2 | 12/2015 | Hershberger et al. | |
| 2003/0146847 A1* | 8/2003 | Swetlik | A61B 5/0002 340/870.15 |
| 2003/0172745 A1 | 9/2003 | Mitchinson | |
| 2005/0000737 A1 | 1/2005 | Fox et al. | |
| 2005/0120793 A1 | 6/2005 | Cochran, Jr. et al. | |
| 2005/0197738 A1 | 9/2005 | Morrison et al. | |
| 2006/0038684 A1 | 2/2006 | Lahiri | |
| 2007/0056368 A1 | 3/2007 | Schneiter | |
| 2007/0088681 A1 | 4/2007 | Aravamudan et al. | |
| 2007/0215239 A1 | 9/2007 | Dorney | |
| 2009/0261981 A1 | 10/2009 | Jones et al. | |
| 2010/0089943 A1 | 4/2010 | Till | |
| 2010/0125362 A1 | 5/2010 | Canora et al. | |
| 2010/0147894 A1 | 6/2010 | Reimann et al. | |
| 2010/0226100 A1 | 9/2010 | Johnson et al. | |
| 2011/0029255 A1 | 2/2011 | Hyde et al. | |
| 2012/0019398 A1 | 1/2012 | Vogt et al. | |
| 2012/0059513 A1 | 3/2012 | Perkins et al. | |
| 2012/0189762 A1 | 7/2012 | Reineccius et al. | |
| 2012/0269150 A1 | 10/2012 | Delorme et al. | |
| 2013/0314244 A1 | 11/2013 | Hershberger et al. | |
| 2014/0166374 A1 | 6/2014 | Deng et al. | |
| 2015/0109143 A1 | 4/2015 | Hershberger et al. | |
| 2016/0162831 A1 | 6/2016 | Hershberger et al. | |
| 2016/0264394 A1 | 9/2016 | Hershberger et al. | |

FOREIGN PATENT DOCUMENTS

| | | |
|---|---|---|
| CN | 201335732 | 10/2009 |
| CN | 201724716 | 1/2011 |
| CN | 201837448 | 5/2011 |
| CN | 202057402 | 11/2011 |
| CN | 202720033 U | 2/2013 |
| CN | 201220296045.4 | 2/2013 |
| JP | 2001229466 A | 8/2001 |
| WO | 03101022 A3 | 12/2003 |
| WO | 2006009841 | 1/2006 |
| WO | 2013177554 A1 | 11/2013 |
| WO | 2013/189207 | 12/2013 |

OTHER PUBLICATIONS

International Search Report for PCT/US2013/042725 mailed Sep. 13, 2013, pp. all.

Supplementary European Search Report received for EP 1379343 dated Jan. 14, 2016, pp. all.

Ranasinghe, et al., "Building Radio Frequency Identification for the Global Environment Sensor-enabled RFID Tag Handbook" dated Jan. 15, 2008, pp. all.

Rotunno, Tom , "http://www.cnbc.com/2015/10/05/out-of-beer-bud-lights-smart-fridge-will-tell-you.html", CNBC, downloaded Oct. 5, 2015, Oct. 5, 2015, pp. all.

* cited by examiner

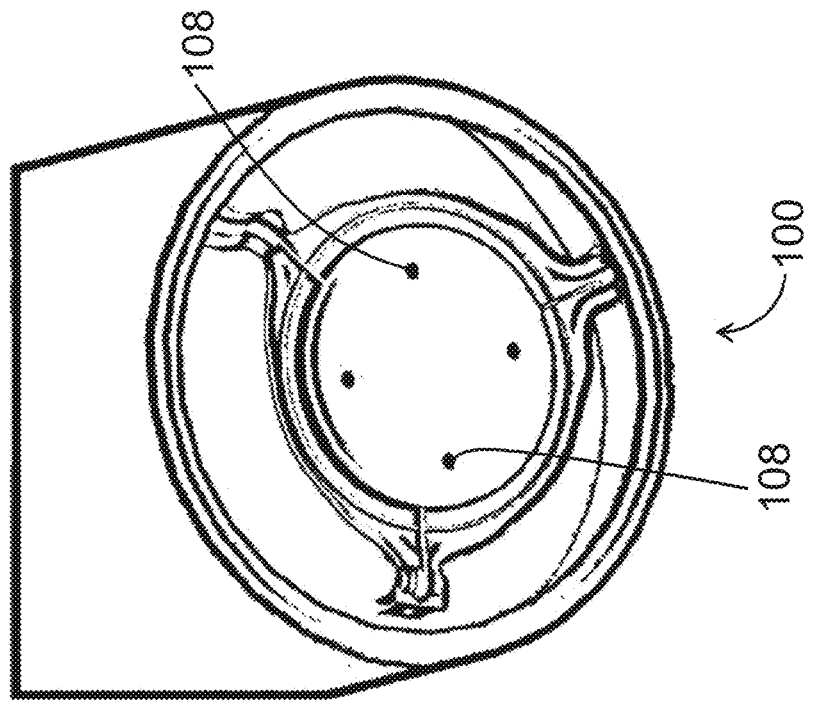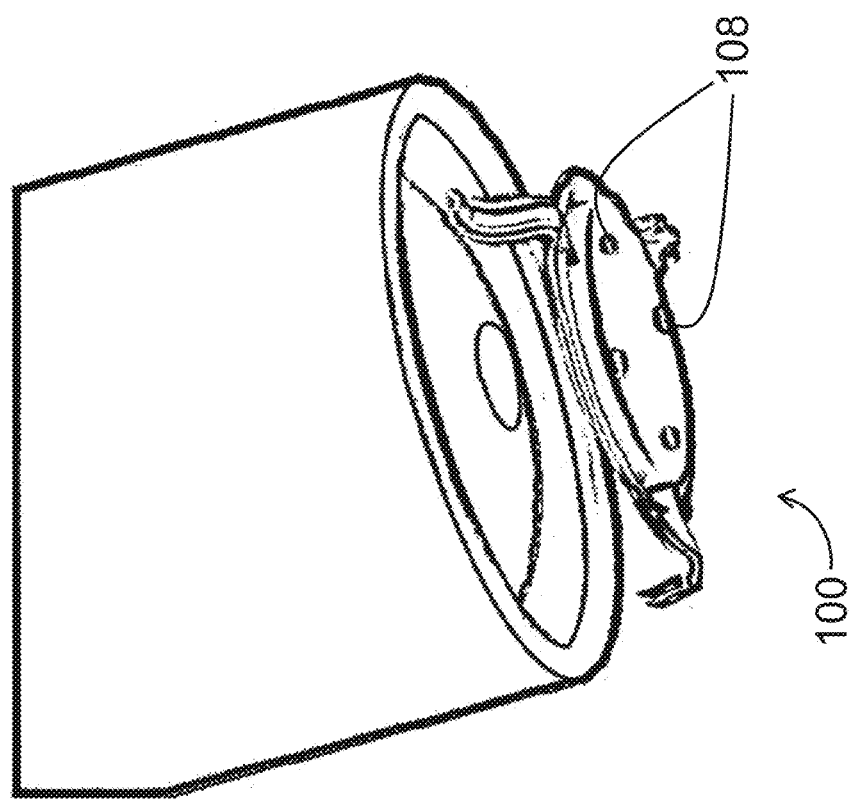
FIG. 2

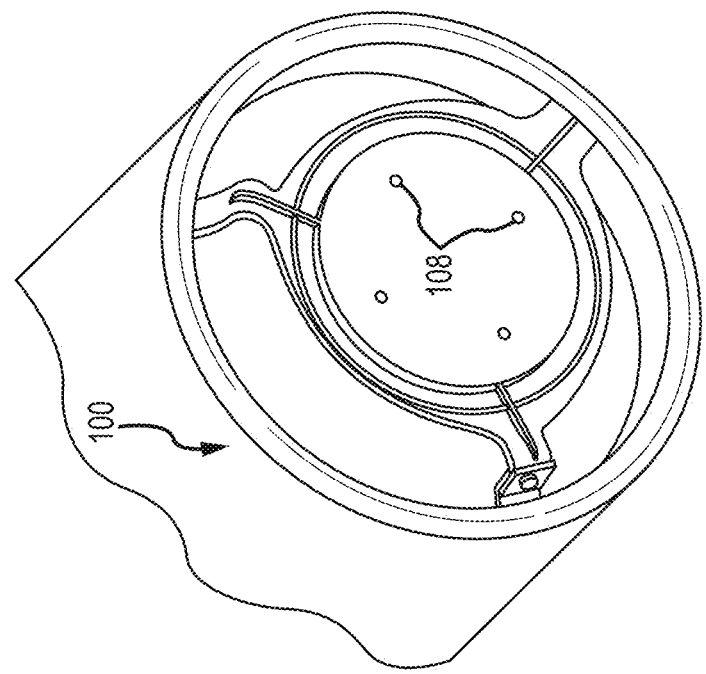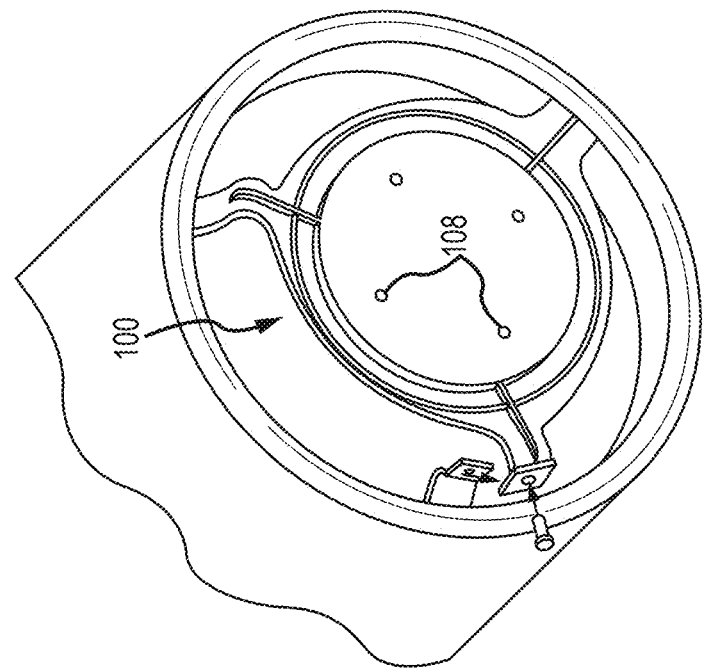
FIG.3

DRAFT BEER SUPPLY CHAIN SYSTEMS AND METHODS

CROSS REFERENCE TO RELATED APPLICATIONS

This application is a continuation of U.S. patent application Ser. No. 14/402,844, filed Nov. 21, 2014, and issued as U.S. Pat. No. 9,485,549 on Nov. 1, 2016, which application is a National Stage Filing of International Application No. PCT/US2013/042725, filed May 24, 2013, which application claims priority to Provisional Application No. 61/651,531, filed May 24, 2012; and International Application No. PCT/U52013/042725 is a continuation of U.S. patent application Ser. No. 13/837,639, filed Mar. 15, 2013, and issued as U.S. Pat. No. 9,221,667 on Dec. 29, 2015, which claims priority to Provisional Application No. 61/651,531, filed May 24, 2012. The aforementioned applications and patents are incorporated herein by reference, in their entirety, for any purpose.

FIELD

Embodiments of the present disclosure relate to managing information related to inventory and distribution, such as the inventory and distribution of draft (draught) beer. Further embodiments of the present inventions relate to monitoring of draft beer and other bulk beverage inventories, and to related data analysis, including automated ordering, prompting for ordering, and mobile marketing.

BACKGROUND

Establishments such as restaurants and bars frequently receive products consumed by customers, such as beverages, from distributors. When an establishment runs low on certain products, the establishment typically contacts the distributor to resupply the establishment's stock of products. However, this process can be time consuming, especially when it is difficult for the establishment to ascertain the quantity of certain products, such as when those products are supplied in bulk, such as in kegs. It was realized by the inventors of the current disclosure that improvements in the supply chain for certain products, such as beer in kegs, are needed. Certain features of the present disclosure address these and other needs and provide other important advantages.

SUMMARY

Embodiments of the present disclosure provide improved draft beer supply chain systems and methods.

In accordance with one aspect of embodiments of the present disclosure, a method is disclosed, the method including attaching a wireless electronic communication device to a container with liquid, the wireless electronic communication device being encoded with information relating to a characteristic of the liquid within the container; attaching a sensor/transmitter to the container; transferring information relating to a characteristic of the liquid within the container from the wireless electronic communication device to the sensor/transmitter; determining the quantity of the fluid (or other material) within the container with the sensor/transmitter; and transmitting information related to the weight of the container and the type of liquid within the container from the sensor/transmitter to a computer database via a wireless network.

In accordance with another aspect of embodiments of the present disclosure, an apparatus in disclosed, the apparatus including a sensor/transmitter adapted to attach to the container, sensor/transmitter including a liquid quantity sensor configured and adapted to detect the amount of liquid within the container, a receiver that receives information related to the liquid in the container from a wireless electronic communication device, and a transmitter that receives information from the receiver and from the liquid quantity sensor, wherein the transmitter transmits information received from the receiver and the liquid quantity sensor to a wireless network.

In accordance with still another aspect of embodiments of the present disclosure, a system is disclosed, the system including a plurality of wireless electronic communication devices, each encodable with information identifying a characteristic of liquid within a container, each wireless electronic communication device being attachable to a container a plurality of sensors each attachable to a container, each sensor configured and adapted to measure the quantity of liquid within the container to which the sensor is attached, receive information from one of the plurality of wireless electronic communication devices attached to the same container as each sensor, the information relating to at least one characteristic of the liquid within the container to which the one wireless electronic communication device and the sensor is attached, and transmit information to a wireless network, the transmitted information including information from the wireless electronic communication device including the characteristic of the liquid within the container to which the sensor is attached, and information about the weight of the container to which the sensor is attached; and a computer database that receives and stores information from the plurality of sensors via the wireless network.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIGS. 2-3 illustrate installation of one form of pressure sensor on the bottom of the keg according to one embodiment of the present disclosure.

DETAILED DESCRIPTION OF THE ILLUSTRATED EMBODIMENTS

Figure 1:
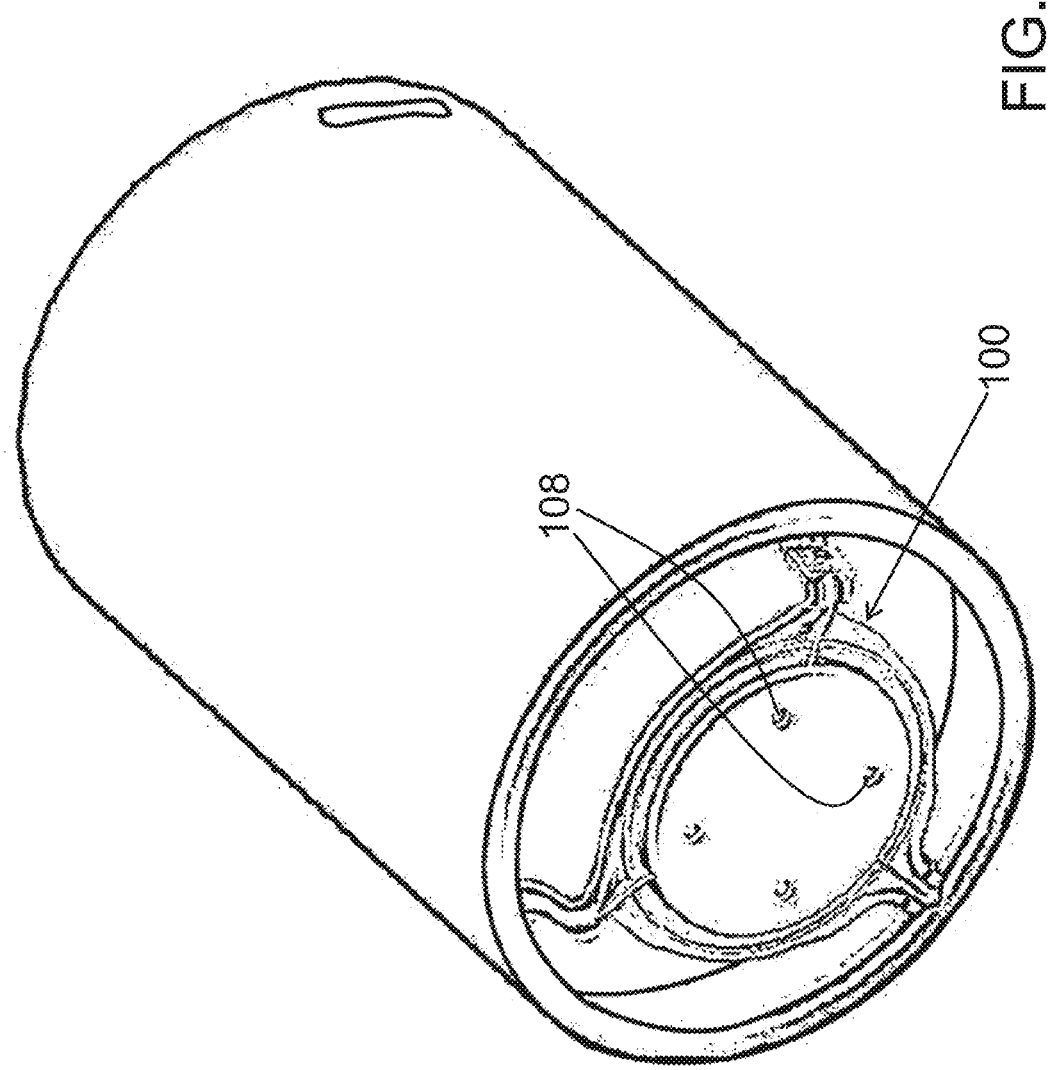
FIG. 1 is a perspective view of a pressure sensor installed on the bottom of a keg according to one embodiment of the present disclosure.

For the purposes of promoting an understanding of the principles of the disclosure, reference will now be made to one or more embodiments illustrated in the drawings and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

At least one embodiment of the present disclosure includes a system/method for measuring the amount of liquid in a portable liquid container and wirelessly communicating that information to a database in order to automatically establish/maintain an inventory of the amount of fluid in each container. Particular embodiments include detecting the level of beer in a keg and relaying that information to a central database that can be used, for example, by a distributor to know when certain kegs need to be replenished.

At least one embodiment includes: a sensor for detecting the fluid level; an identification device that identifies the brand/type of fluid (beer); a transmitter/link that wirelessly connects the sensor and ID device to a database; and a database for maintaining the information (likely connected to a wireless network).

Detecting the level of fluid (beer) in each individual container (keg) may be accomplished in at least two ways. One is a weight sensor attached to the bottom of the portable keg. Another is a sensor that determines the fluid level by generating and evaluating a signal directed to the container. One example is a transmitter that transmits energy into the container. Another example is a transmitter that reflects energy (e.g., sound waves) off the surface of the liquid.

Identifying the brand/type of fluid (beer) in each individual container (keg) may be accomplished in at least two ways. One is to encode information related to the brand/type of liquid (beer) in each container (keg) to the fluid level sensor attached to each keg. Another is to use a device separate from the fluid level sensor and encoded this separate device with the brand/type of beer in the keg. This separate identification device can be attached to each container (such as to the hand grip holes in a keg) using, e.g., a bracket, zip tie, clip, bayonet fitting, etc.

The transmitter can receive information from both the fluid level sensor and the identification device and can wirelessly relay this information (e.g., using established wireless networks) to a database. In one embodiment, the transmitter is included with the fluid level sensor; however, other variations include a transmitter included with the identification device or a transmitter that is separate from both the fluid level sensor and the identification device.

At least one embodiment utilizes a combined fluid level sensor and transmitter with a separate identification device.

The identification device may be a wireless communication device (such as an RFID device, which may take the form of an RFID tag and/or a bar code display), or may require physical connection (such as a thumb drive or the like). In use, a delivery person can arrive at a bar/restaurant with a keg that has an RFID device attached identifying the brand/type of beer (or other characteristic of the liquid in the container to which the RFID device is associated) in the keg. A combined fluid level sensor and transmitter (which can be generic and used with any keg) is attached to the container (keg), which may be accomplished prior to delivery to the customer, and the combined sensor/transmitter is paired with the RFID device. Once paired, the sensor/transmitter can transmit information related to the amount of beer and the brand/type of beer (or other characteristic(s) of the liquid) in the keg to the database. Multiple kegs and sensor/transmitters can be monitored and information about the kegs can be maintained, interpreted, and disseminated in a variety of ways that may be useful to brewers, distributors, sales establishments, and/or customers. See, e.g., FIGS. 10-12 and 14.

A user of the database can be able to use real-time information about the kegs in a variety of ways, such as enabling the distributor to automatically deliver fresh kegs when needed or to provide real-time information to consumers so the consumer can determine which bars/restaurants have their preferred beverage in stock. Various embodiments include database interfaces for the restaurant owner, customers, distributors and beer manufacturers that may be used in a variety of combinations to facilitate the efficient delivery of liquid in bulk containers for consumption.

At least one embodiment of the present disclosure uses on-keg monitoring devices to keep track of substantially real-time levels of draft beer in inventories of on-premise beer retailers. Data collector(s) at each site periodically transmit the data to a centralized data storage and processing facility. Alerts are sent to key personnel when it is time to place another order, and supply chain mechanisms leverage the data for efficient resource planning and movement at all stages. Consumers are able to find favorite beers by accessing the inventory data through a mobile app, and other uses are made of the collected data.

The draft beer industry employs re-usable aluminum kegs to distribute draft beer. The kegs are simple aluminum vessels that can be filled with beer, pressurized, and then the beer flows out of a top-mounted valve/spout. The keg typically embodies no technology beyond a simple pressure valve/spout on the top.

Kegs are often designed with a spherical round bottom that is surrounded or collared with a round aluminum sheath that allows the keg to sit upright and level. This collar on the bottom of the keg, combined with the spherical round bottom, creates a constructed void or space under the keg. All kegs have this empty space under the main container portion.

At least one embodiment of the present disclosure includes a sensor and transmitter (which may be referred to as a sensor/transmitter) that attaches to the bottom of the keg, such as fitting in this space under the bottom of the keg. In one embodiment, illustrated in FIGS. 1-3, the sensor 100 is generally a pressure sensor, which in at least one embodiment is an analog electronic device that converts weight into an analog value calibrated to the weight of a full keg. When the sensor 100 is mounted to the bottom of the keg, the sensor weight element 108 rests on the floor. In some use scenarios, kegs are stacked on top of each other. In such situations, the system vendor can supply a rigid, hard plastic mat (not shown) that can fit on the top of a keg to provide a hard, level surface for the keg sensor/transmitter on the next layer up to sit on. In this stacking scenario, the sensors on the bottom kegs can be adjusted to account for there being more than one keg resting on top of the sensor weight element 108, such as by transferring weight information to/from the kegs above. In the illustrated embodiment, sensor 100 has a circular center portion with connection brackets extending outward in a generally star-shaped configuration, although other shapes are contemplated.

The sensor 100 registers pressure from the weight of the keg. In the case of a full keg that has a maximum volume and weight, the sensor registers a maximum analog value, which is converted in the present embodiment into a digital value by an analog-to-digital converter (ADC) onboard the microcontroller chip in the sensor/transmitter unit. In some embodiments, the conversion uses an 8-bit value, while in others, another range of digital outputs (such as 0-20) is used. Using this latter form as an example, as the keg is depleted, the value changes from 20 to 19, 18, 17, etc. all the way down to 0 (zero), which is the value corresponding to the weight of an empty keg. The keg sensor/transmitter electronics communicate the weight value of 0-20 to the keg transmitter. The keg transmitter may be housed in the bottom of the keg and may be connected by wire (or wireless) to the keg sensor. In the present embodiment, the keg transmitter communicates with the local uplink/gateway (such as using ZigBee and/or Bluetooth protocols), which communicates with a larger network (such as a cellular telephone network or a mesh network). Alternate embodiments utilize alternate wireless data transmission technologies as will occur to those skilled in the art in view of the present disclosure.

In some embodiments, the keg sensor can remain asleep and wake up periodically to receive an signal related to the current weight of the keg, communicate with the network (e.g., the cellular network, which may be via the local uplink/gateway) and transfer data to and/or from a database (which may take approximately 10-20 seconds in some embodiments), then go back to sleep. In one embodiment, the keg sensor wakes up and communicated with the network once every hour. In other embodiments, the sensor will wake up more or less frequently depending on the time of day or the day of the week/year. In still other embodiments, the sensor wakes up based on a schedule received from a database, which may be adjusted by the database. For example, if an algorithm evaluating data form a database determines that beer A is selling quickly and beer B is not selling quickly, a command can be sent through the network to one or more sensors associated with beer A (e.g., through a cellular network, which may be sent to the sensor via a local uplink/gateway) instructing the one or more sensors associated with beer A to wake up and communicate with the database every 20 minutes and/or a command can be sent through the network to one or more sensors associated with beer B instructing the one or more sensors associated with beer B to wake up and communicate with the database every 2 hours.

In at least one embodiment, the keg transmitter may also have a flash memory that has been preprogrammed with several software parameters. One of these parameters can be a Serial Number corresponding to the individual keg sensor/transmitter. That is, each and every keg sensor Transmitter can have its own unique Serial Number that is programmed into the software when the unit is manufactured. In addition to the Serial Number, the software version number may be pre-programmed. The keg transmitter software may also be programmed with certain functions and intelligence. In this embodiment, the software may be programmed at the factory to perform various functions, including waking itself up every X number of hours and transmitting a signal via a wireless network (e.g., ZigBee and/or Bluetooth) to check whether it is in range of an uplink/gateway. When the transmitter is shipped to an equipped warehouse, the keg transmitter can first wake up and connect with an uplink/gateway. At that point, the keg transmitter can begin to check for an uplink/gateway every hour.

Figure 4A:
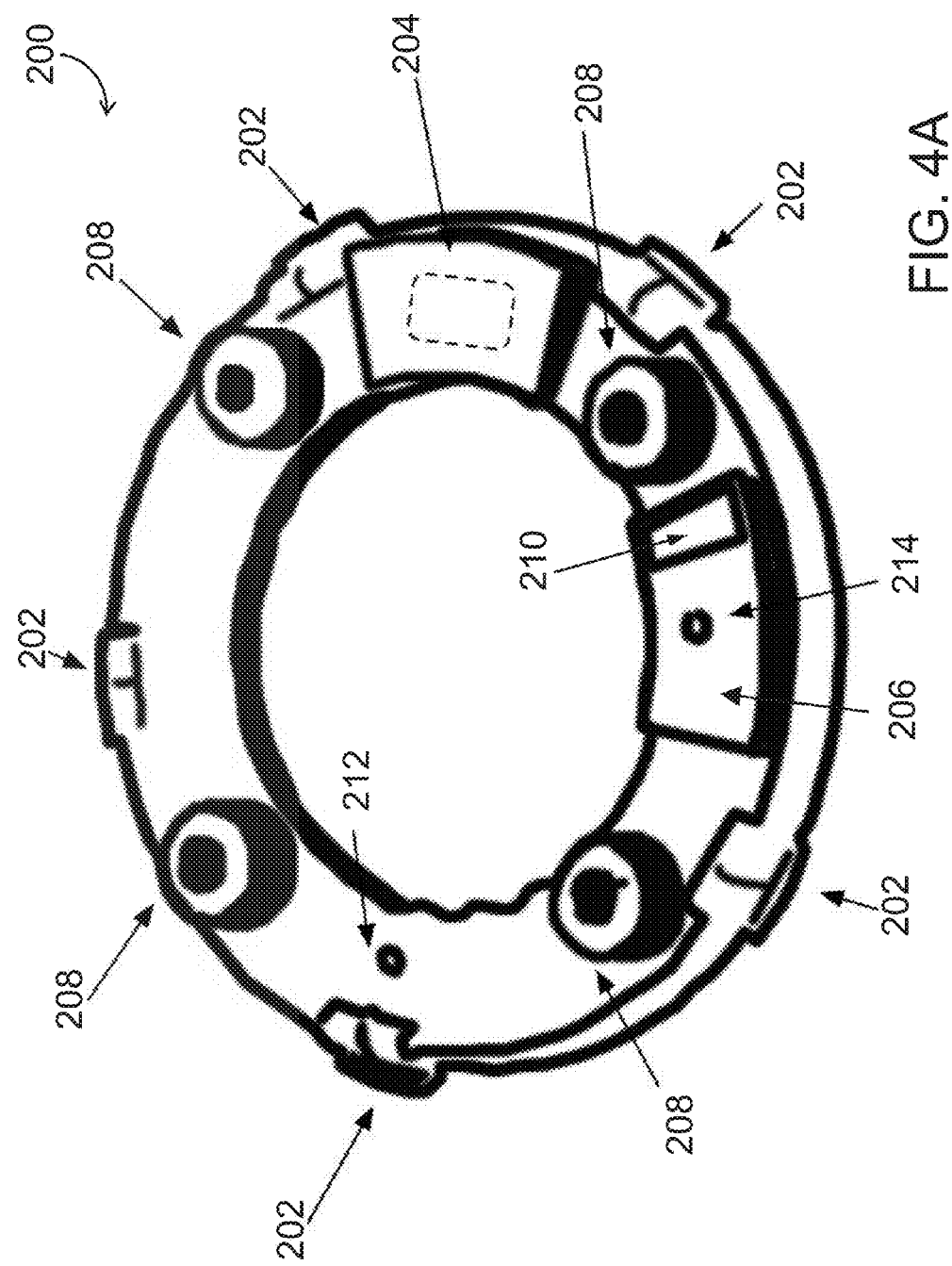
FIG. 4A is a perspective view of the bottom of a pressure sensor according to another embodiment of the present disclosure.
Figure 4B:
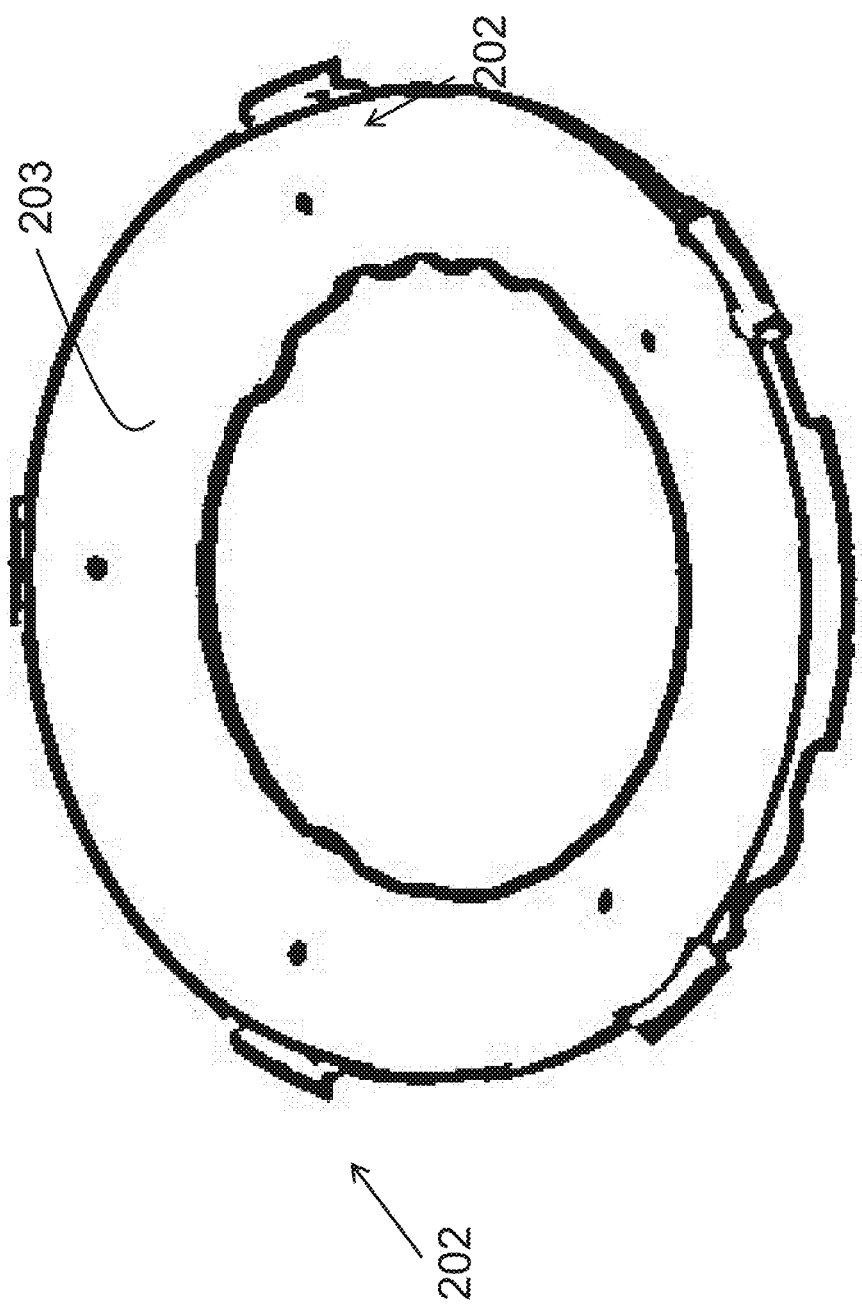
FIG. 4B is a perspective view of the top of the pressure sensor depicted in FIG. 4A.
Figure 4C:
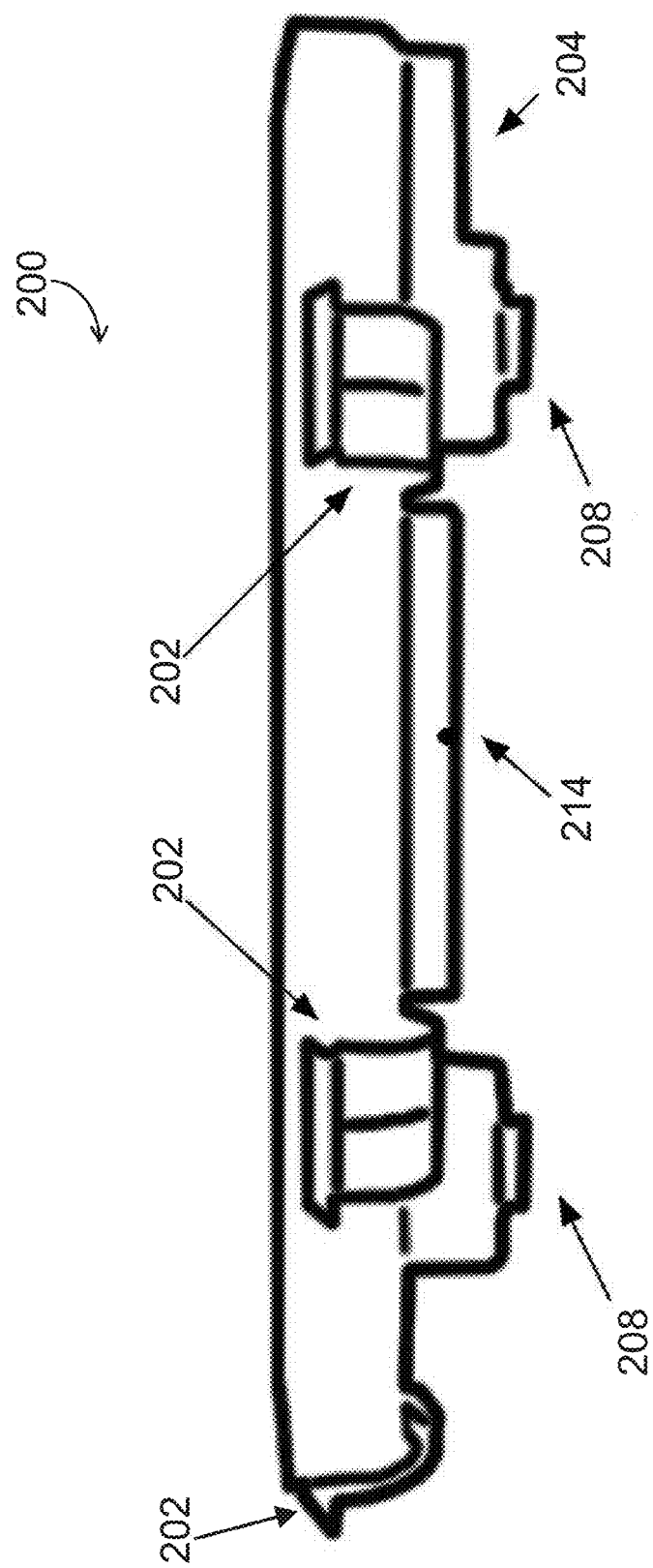
FIG. 4C is a side elevational view of the pressure sensor depicted in FIG. 4A.
Figure 5A:
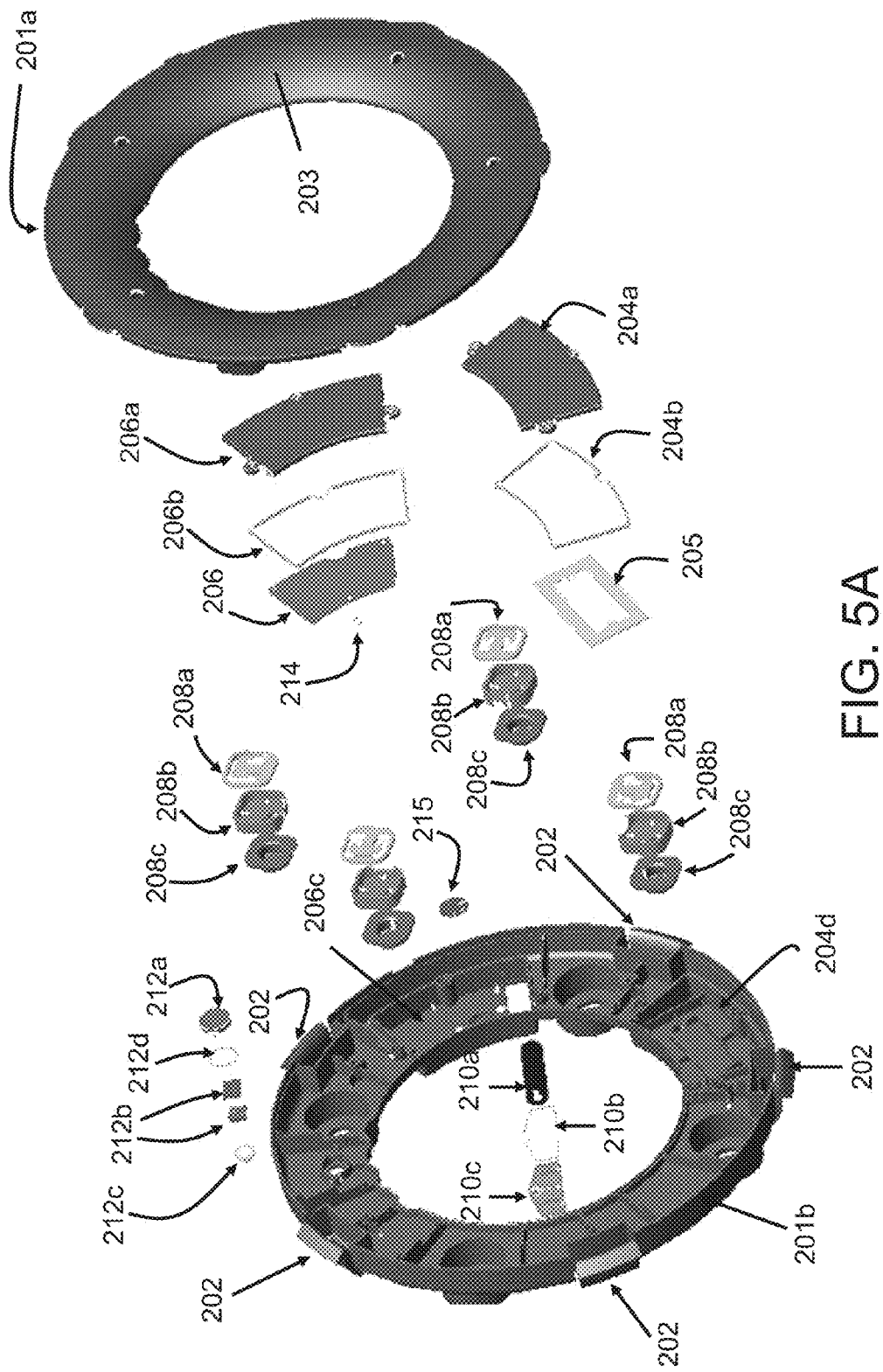
FIG. 5A is an exploded view of the pressure sensor depicted in FIG. 4A.
Figure 5B:
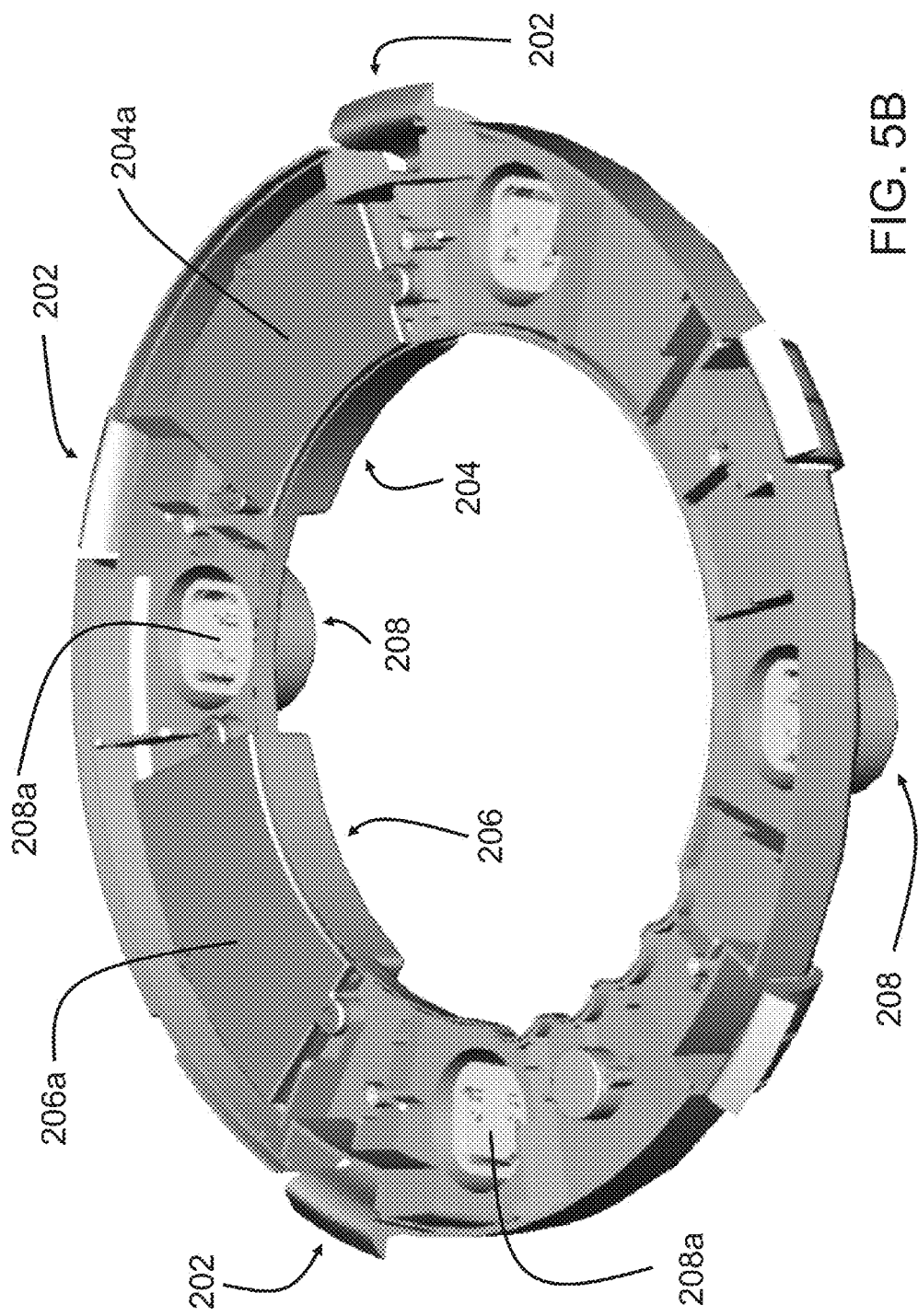
FIG. 5B is a perspective view of the pressure sensor depicted in FIG. 4A with at least the upper housing not depicted.
Figure 5C:
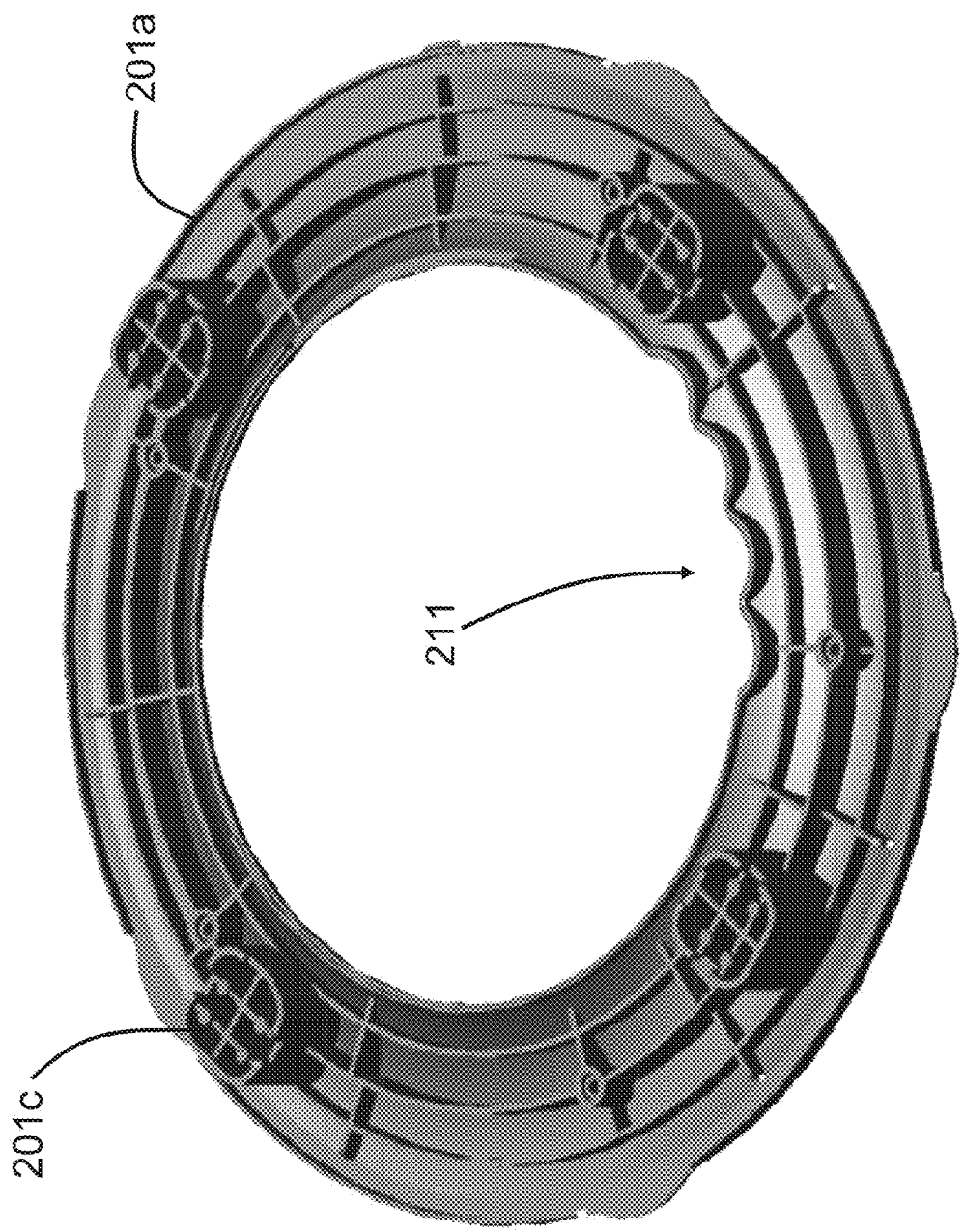
FIG. 5C is a perspective view of the upper housing lower surface of the pressure sensor depicted in FIG. 4A.
Figure 5D:
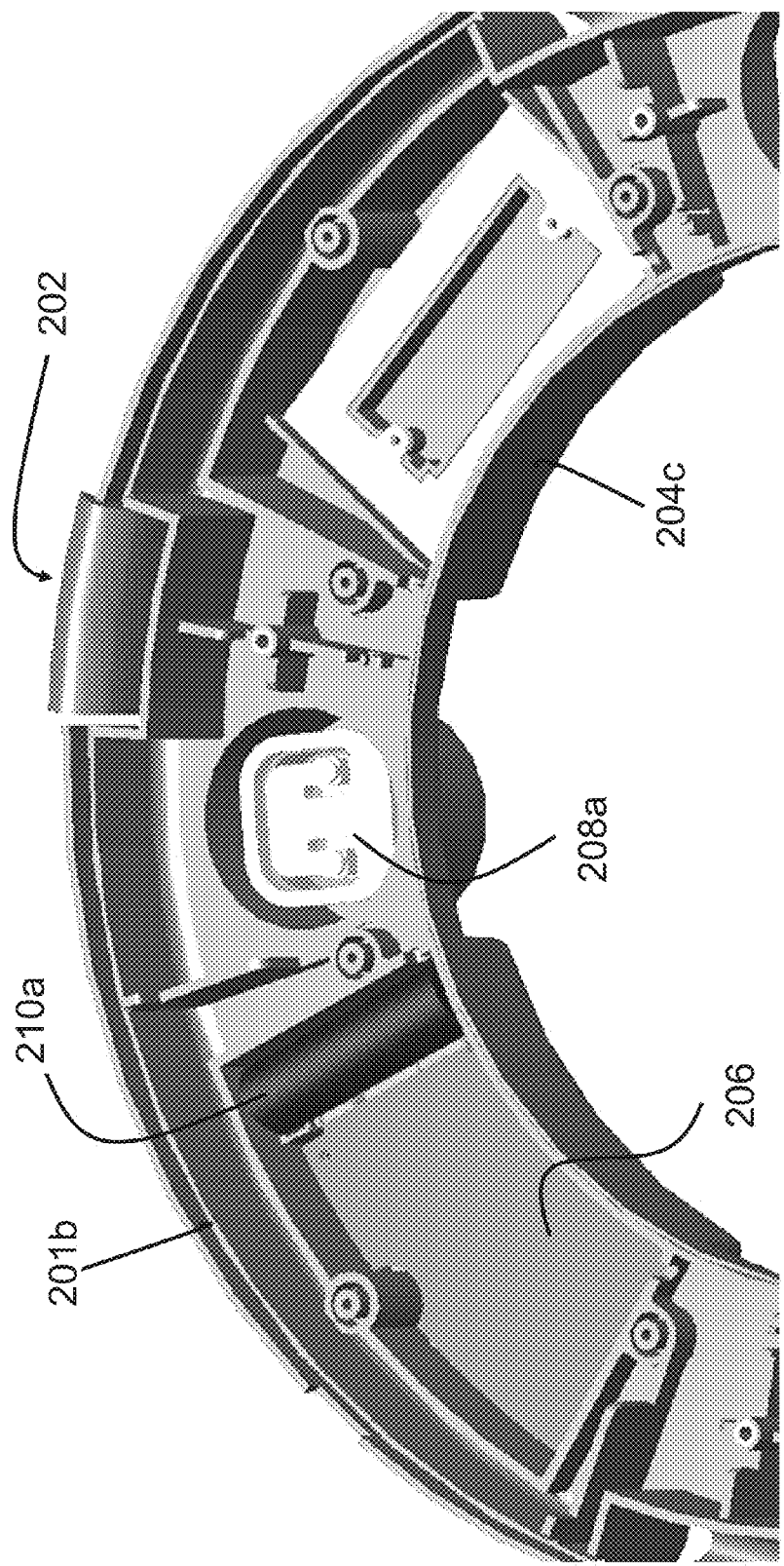
FIG. 5D is a partial perspective view of the pressure sensor depicted in FIG. 4A with at least the upper housing not depicted.
Figure 5E:
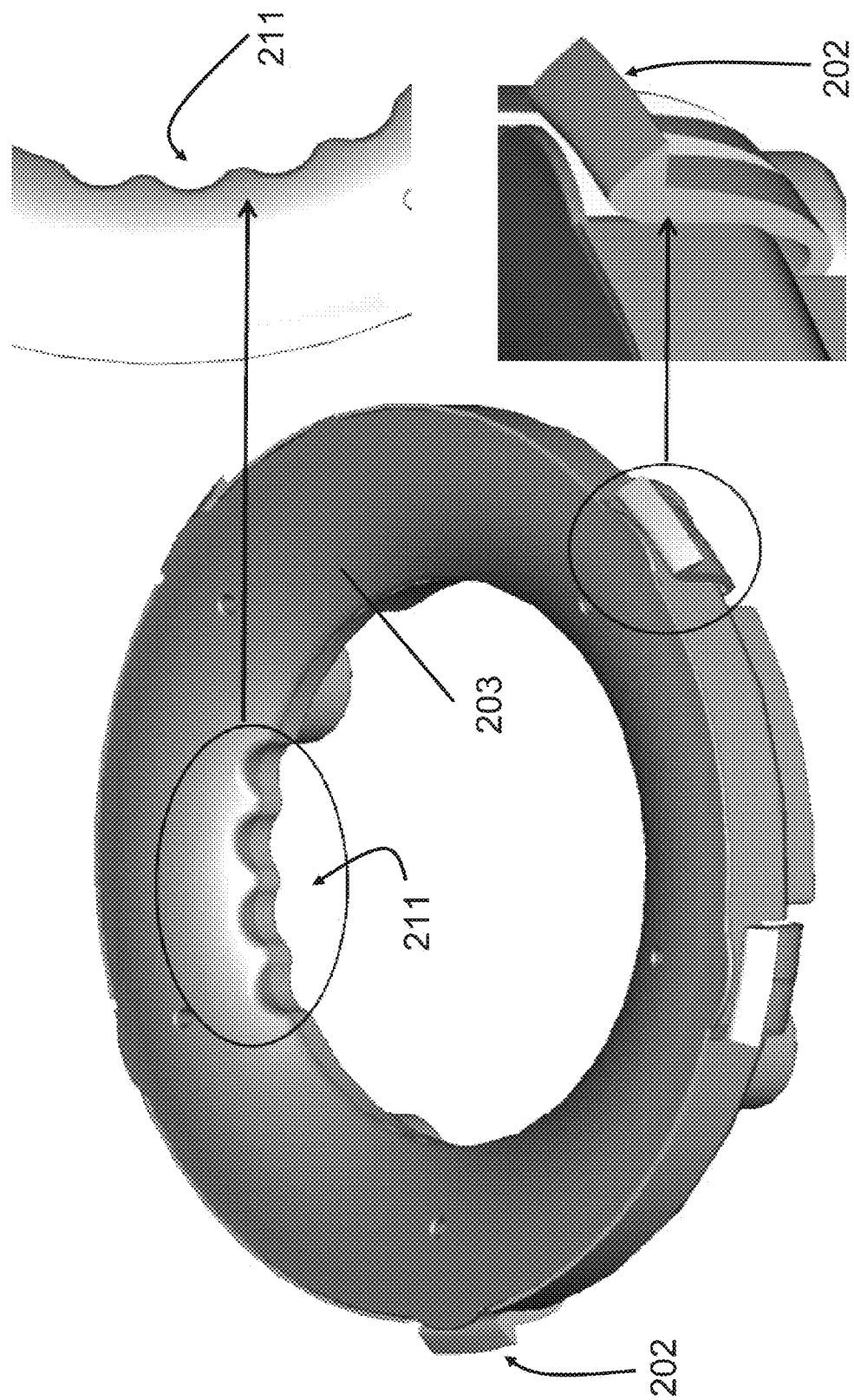
FIG. 5E is a perspective view of the pressure sensor depicted in FIG. 4A with detailed views of various features.

Depicted in FIGS. 4-6 is a sensor 200 according to another embodiment of the present disclosure. Sensor 200 is configured and adapted to attach to the bottom of a large beverage container (such as a beer keg) and sense the weight of the container. Sensor 200 includes an upper housing 201a, a lower housing 201b, and one or more fasteners 202 that prevent sensor 200 from falling off the keg when the keg is lifted off the support surface or tilted. Sensor 200 also includes one or more abutment surfaces 203 that abut the bottom surface of the keg and permit sensor 200 and support the keg keeping it slightly elevated above the support surface. In the illustrated embodiment, sensor 200 is doughnut-shaped (toroidal) (also referred to as ring-shaped) being generally circular with a circular aperture in the center, although other shapes are contemplated.

Figure 6A:
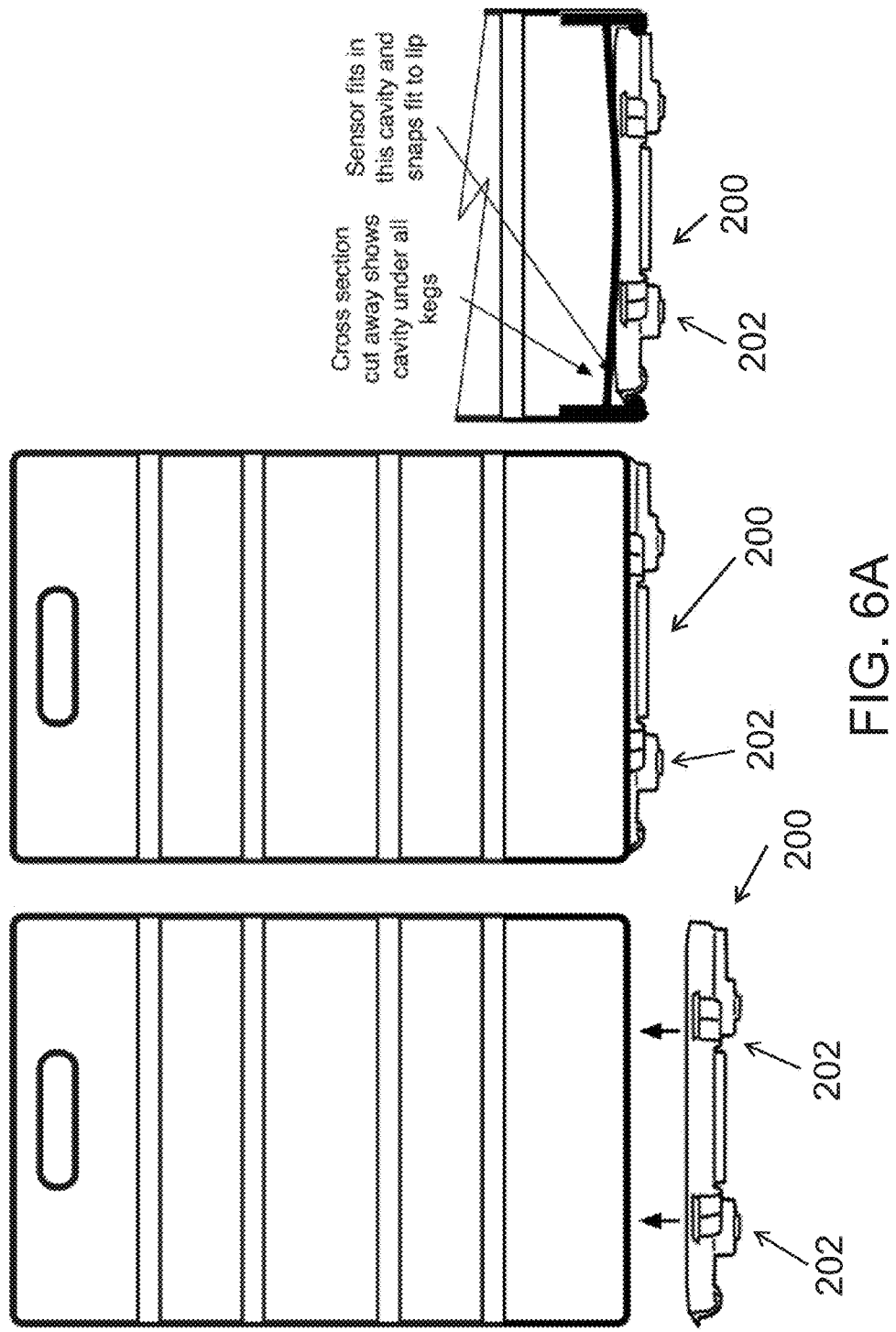
FIGS. 6A and 6B are side elevational views of the pressure sensor depicted in FIG. 4A being installed on the bottom of a keg according to one embodiment of the present disclosure.
Figure 6B:
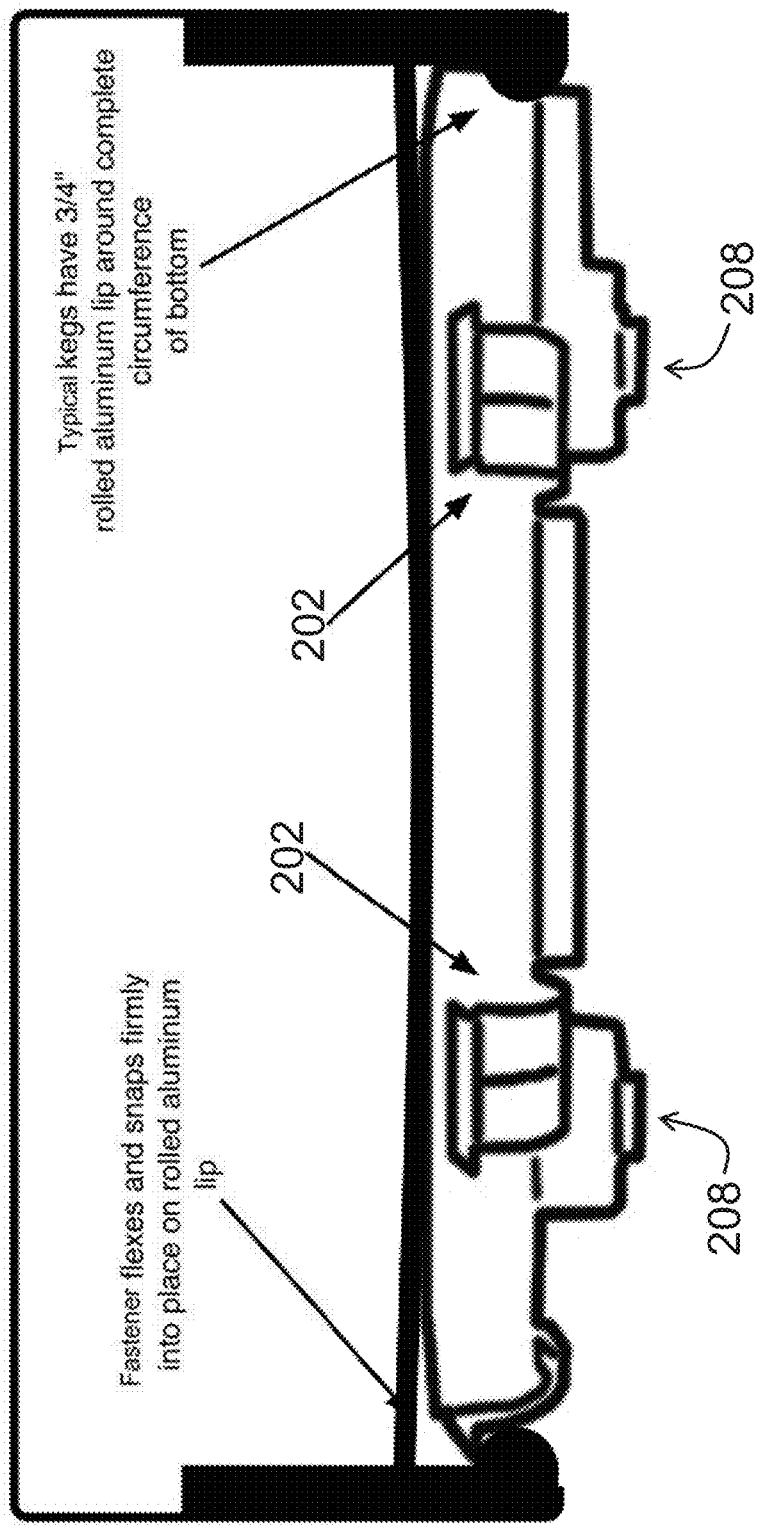

When installed, sensor 200 attaches inside the cavity (false bottom) on the underside of the keg (see, e.g., FIGS. 6A and 6B). Sensor 200 optionally does not extend to the outside surface of the keg, and may optionally attach to the keg at a location where sensor 200 does not contact the support surface and is not damaged when the keg is tipped onto its bottom edge/lip and rolled/rotated as is commonly done when moving kegs (see, e.g., FIG. 6B). In the illustrated embodiment, sensor 200 includes five fasteners 202 that clip to the inside of the lip that forms the bottom of the keg. See e.g., FIGS. 6A and 6B. In at least one embodiment, fasteners 202 are configured and adapted to allow a user to attach sensor 200 to a keg and detach sensor 200 from a keg using only the user's hands. In FIG. 6B the sensor is depicted as flexing and snapping firmly into place on the rolled lip, although other embodiments affix to the keg in different, yet secure, fashions.

In at least one embodiment, a user may place sensor 200 on the support surface, place a keg on top of sensor 200, and use a downward force to attach sensor 200 to the bottom of the keg. The downward force may be supplied in whole or in part by the weight of the keg (and possibly its contents). In still other embodiments, a user can attach sensor 200 to the bottom of a keg by placing sensor 200 on a support surface, tipping the keg at an angle and rolling the keg on its lip into close proximity with sensor 200, then lowering (un-tipping) the keg onto sensor 200, and using a downward force of the keg on sensor 200 (which may be supplied in whole or in part by the weight of the keg itself) to connect sensor 200 to the keg. In some embodiments, the connection between sensor 200 and the keg is sufficiently strong so that sensor 200 will not disconnect from the keg when the keg is raised above the support surface (or tipped with respect to the support surface) until the user disengages one or more of the fasteners 202.

Sensor 200 further includes a receiver 204 that receives data from an electronic device (typically attached to a keg, such as an RFID device) containing information about a characteristic of the fluid within the keg. (As used herein, a characteristic of the fluid within a keg includes, but is not limited to, the brand-name, type, manufacture date, or other characteristic about the fluid a distributor, retail seller, or consumer would be concerned with). Receiver 204 may be contained within a compartment (e.g., receiver cavity 204d) that is covered by receiver cover 204a, and may optionally include a waterproof strip 204b. Receiver 204 may also include an antenna 205, which may be contained within the same compartment as receiver 204. Receiver 204 and/or antenna 205 may be a printed circuit board (PCB).

Sensor 200 further includes a transmitter 206 that communicates with a wireless network and can transmit information concerning a characteristic of the fluid in the keg to which sensor 200 is attached (which may be received from an RFID device 220 associated with the keg via receiver 204) and/or information about the weight of the keg to the wireless network. (See, e.g., FIG. 14). Transmitter 206 may be contained in a compartment (e.g., transmitter cavity 206c) covered by transmitter cover 206a, and an optional waterproof strip 206b may be included to inhibit water from entering into the transmitter compartment. In one embodiment, transmitter 206 is relatively planar in appearance as depicted by the example transmitter 206 and may be a printed circuit board (PCB).

In alternate embodiments receiver 204 is both a receiver and a transmitter capable of two-way communication with the electronic device (e.g., RFID device) associated with the keg containing information about the liquid contained within the keg.

In alternate embodiments transmitter 206 is a receiver and a transmitter capable of two-way communication with the wireless network.

Sensor 200 further includes one or more weight sensors 208 that sense the weight of the keg (such as by measuring the pressure exerted on the weight sensor 208 by a support surface upon which sensor 200 and the keg are placed). In one embodiment, sensor 208 includes a weight sensing member 208a, a frame 208b, and a foot 208c. Four weight sensors 208 are depicted in the embodiment represented by FIGS. 4-6. In embodiments with fewer than three weight sensors, additional supports can be utilized so that the keg to which sensor 200 is attached is stable and will not easily tip when resting on a support surface. In some embodiments, the upper housing 201a can include support locations (such as the four weight sensor support locations 201c depicted in FIG. 5c) that may be used to hold the weight sensors in place.

Sensor 200 can include a battery compartment 210 for housing a battery 210a to provide electrical power to the various components of sensor 200. The battery compartment may be covered by a cover 210c and an optional waterproof strip 210b.

Figure 13:
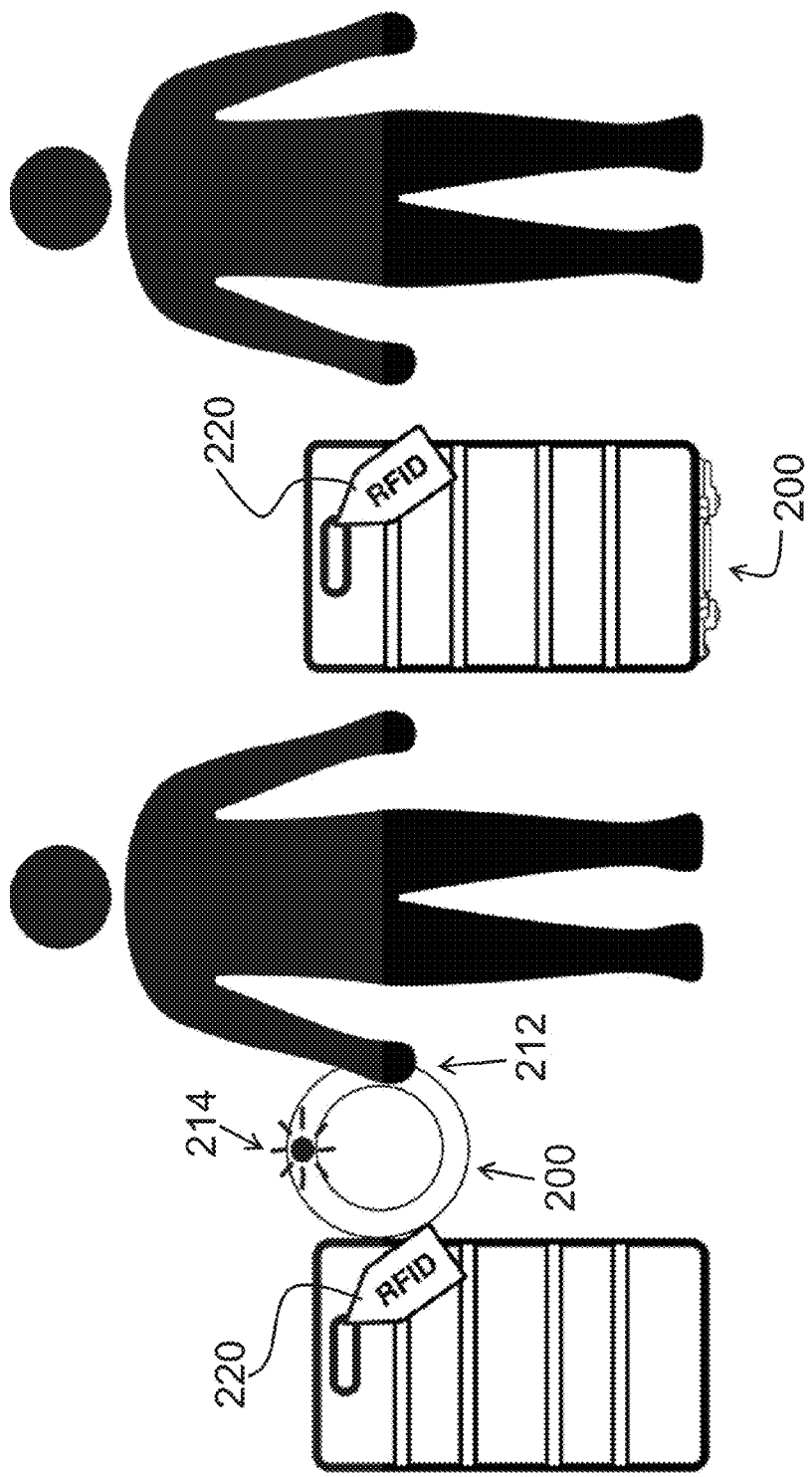
FIG. 13 illustrates the pairing and installation of a sensor/transmitter to a keg with an electronic identification device according to one embodiment of the present disclosure.
Figure 14:
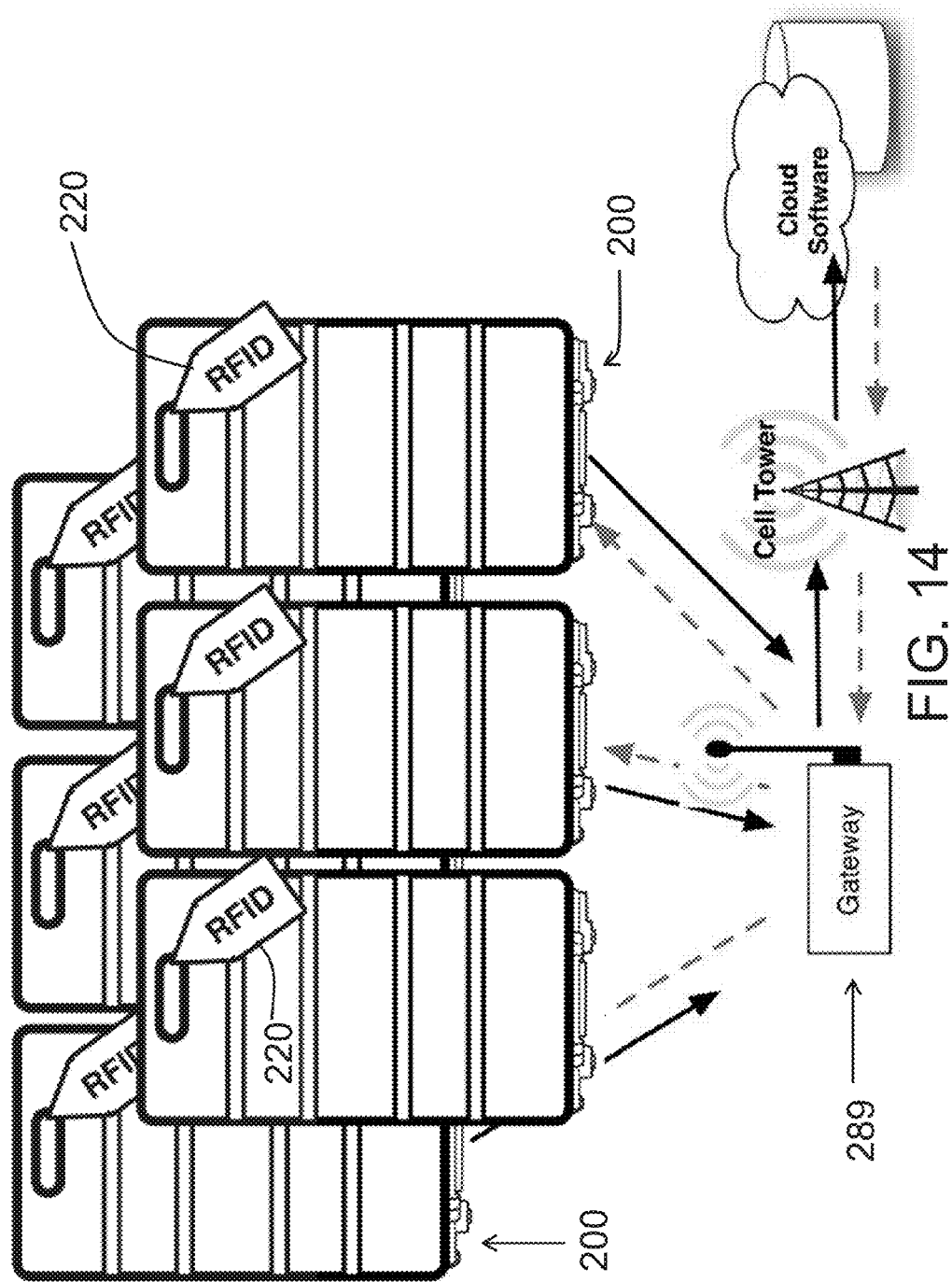
FIG. 14 is a schematic diagram of a bulk beverage information collection, management, processing and action system according another embodiment of the present disclosure.

Sensor 200 may also include an optional RFID pairing capability in which a user can pair sensor 200 with an RFID device 220 (e.g., an RFID tag) (see, e.g., FIG. 13) containing information about the liquid in the container to which sensor 200 is (or will be) attached. As an example, the pairing system may include a pairing button 212 that a user depresses when in proximity to the RFID device with information related to the liquid in the keg and transfer this information from the RFID device to sensor 200. In at least one embodiment, pairing button 212 includes pairing switch cover 212a, pairing switch 212b, button 212c and an optional waterproof strip 212d. Sensor 200 can then transmit this information related to the liquid in the keg to a wireless network. An optional pairing light 214 (and/or another indicator such as sound generator 215) may be included as an indication to the user that sensor 200 has been paired with the RFID device. FIG. 13 depicts a user pairing a sensor to an RFID device attached to a hand hold aperture of a keg then installing the paired sensor on the keg.

Sensor 200 may also include a handhold 211 (which may include indentations) that can assist a user in handling sensor 200. In embodiments where the orientation of sensor 200 may not be readily ascertained by a user (such as when sensor 200 is symmetrical), handhold 211 may serve as an indication of the orientation of sensor 200 (such as being positioned at a certain orientation with respect to the pairing button 212 to facilitate the user quickly locating pairing button 212), or can assist in easing removal of sensor 200 from a keg by providing the user a readily identifiable and easy place to pull the sensor 200 away from the keg.

In some embodiments of the present invention, the pairing device and RFID devices are configured for short range use to avoid interference with other RFID devices that may be stored nearby. For example, in one embodiment, the pairing system and RFID device have a maximum pairing range of approximately 15 feet. In other embodiments, the pairing system and RFID device have a maximum pairing range of approximately five (5) feet. In yet other embodiments, the pairing system and RFID device have a maximum pairing range of approximately two (2) feet. In still further embodiments, the pairing system and RFID device have a maximum pairing range of approximately one (1) foot. The short range pairing feature may have particular advantages in environments where there are multiple kegs with a sensor 200 and RFID device attached to each keg. (See, e.g., FIG. 14).

In at least one embodiment, each RFID device is programmed with a unique serial number and unique attributes of the liquid contained in the keg can be assigned to the tag via a wireless network and the attributes associated with a particular RFID device may be manipulated through the wireless network without requiring use of an RFID writer in close proximity to the RFID device.

The sensors and sensor/transmitters disclosed herein are constructed of material sufficiently strong to carry the large weight loads of a full keg and capable of operating at low temperatures, such as would be encountered in a refrigerated location, and may include various types of plastics, composites, metals, and/or alloys.

The keg sensor/transmitters may be sent in quantity to the beer distributor's warehouse. At the beer distributor's warehouse, the keg sensor/transmitter may be installed on a keg. For example, in one embodiment, the keg sensor/transmitter is mounted on the bottom of the keg in the recessed cavity that is created where the convex portion of the keg comes in contact with the outer edge. The keg has a molded lip on the outer portion of the keg that allows a tongue-and-grove fitting to be pushed into place. To achieve the fitting of the keg sensor/transmitter to the bottom of the keg, one may use a suitable keg installer, which will now be described in view of FIG. 7.

The keg installer 250 in this embodiment is a fabricated aluminum and steel platform consisting of three large pieces: the inbound ramp 252, the Plateau 254, and the outbound ramp 256. The inbound ramp 252 is approximately four feet wide and six feet long. The inbound ramp 252 has a total of approximately 20 rubber rollers 258 with each roller approximately 4 inches in width. The rollers 258 are mounted on aluminum rails spaced the width of a beer keg. There is a hollow space between the rails. There are 10 rollers on the left rail and 10 rollers on the right rail. The beginning part of the inbound ramp 252 uses small rollers that start at floor level. The inbound ramp 252 is on an incline starting at floor level then rising to approximately 5 inches off of the ground.

In use, a beer distributor warehouse worker moves a full keg of beer to the beginning of the inbound ramp 252 and positions the keg in the middle of the ramp. The worker then slightly tips the keg and scoots it forward so the keg rests on the first rubber rollers of the inbound ramp 252. The worker then pushes the keg up the inbound ramp 252 as it rolls on the rubber rollers.

The inbound ramp 252 in this embodiment is bolted directly to the Plateau portion of the keg Installer. The Plateau has approximately 12 rollers—6 rollers on the left rail and 6 rollers on the right rail. The rails and rollers in this embodiment match up exactly in alignment with the rails and rollers on the inbound ramp 252.

The outbound ramp 256 in this embodiment is approximately four feet wide and six feet long and is bolted directly to the Plateau portion of the keg installer 250. The outbound ramp 256 has approximately 20 rollers with each roller approximately 4 inches in width. There are 10 rollers on the left rail and 10 rollers on the right rail. There is an open space between the rails. The rails and rollers match up exactly in alignment with the rails and rollers on the Plateau. The outbound ramp 256 is on a decline starting at approximately 5 inches off of the ground going down to floor level.

In the open space between the rails on the outbound ramp 256 is a keg sensor/transmitter Installation device. A keg sensor/transmitter that is ready to be installed on to a keg is placed into the platform device between the rails. As the keg descends the outbound ramp 256 the weight of the keg pushes down on the installation device platform triggering a hydraulic lever. That lever flexes the keg sensor/transmitter housing and pushes the keg sensor/transmitter housing into the cavity in the bottom of the keg. The hydraulic lever then un-flexes the keg sensor/transmitter housing, and the housing snaps into place in the keg bottom cavity.

The warehouse worker then continues to move the keg down the outbound ramp 256 to floor level. The keg now has the keg sensor/transmitter installed, and it is ready to be delivered to the retailer. The warehouse worker now can put a new keg sensor/transmitter into the keg installer 250 and repeat the process.

Once a keg is empty, it can be picked up by the beer distributor delivery driver to be returned to the beer distributor warehouse. Since the keg is now empty, the keg is very light and can be easily picked up and turned over by the delivery driver or warehouse employee. The keg sensor/transmitter can have the bar code or QR code assigned to it in the distributor's inventory system. The keg sensor/transmitter in this embodiment can be taken off of the keg by hand and can be put in one of, e.g., four bins.

Bin #1: The sensor is good and can be re-used. It is put in a bin labeled with the beer brand and type.

Bin #2: The beer brand and type is no longer in distributor inventory. The warehouse employee uses the SaaS Software to re-assign the keg sensor/transmitter's individual serial number to the SKU associated with another beer brand and type.

Bin #3: The bar code is faded and needs to be replaced.

Bin #4: The battery life of the sensor has exceeded normal life, and the sensor needs to be returned to the system vendor.

At system initialization, the SaaS database can be populated with all of the current beer brand and type SKUs. As time goes by, however, new beer SKUs may appear. Each beer distributor warehouse and accounting employee on the overall system can enter in new beer brands and types with their corresponding SKUs. These new SKUs can be made available to all beer distributor users across the entire overall system. That is, the process of updating new SKU's into the SaaS system can be crowdsourced.

The keg installer 250 in the embodiment just described is made of three pieces—the inbound ramp 252, the Plateau, and the outbound ramp 256—so that it can be easily assembled and disassembled for shipping to beer distributor warehouses. In alternative embodiments and situations, the keg installer 250 can be used with the Plateau and the outbound ramp 256, eliminating the inbound ramp 252. The option is up to the beer distributor warehouse. By removing the inbound ramp 252. a forklift can be driven up directly to the Plateau portion of the Installer, and the keg can be moved off of the forklift onto the Plateau to complete the installation.

Figure 7:
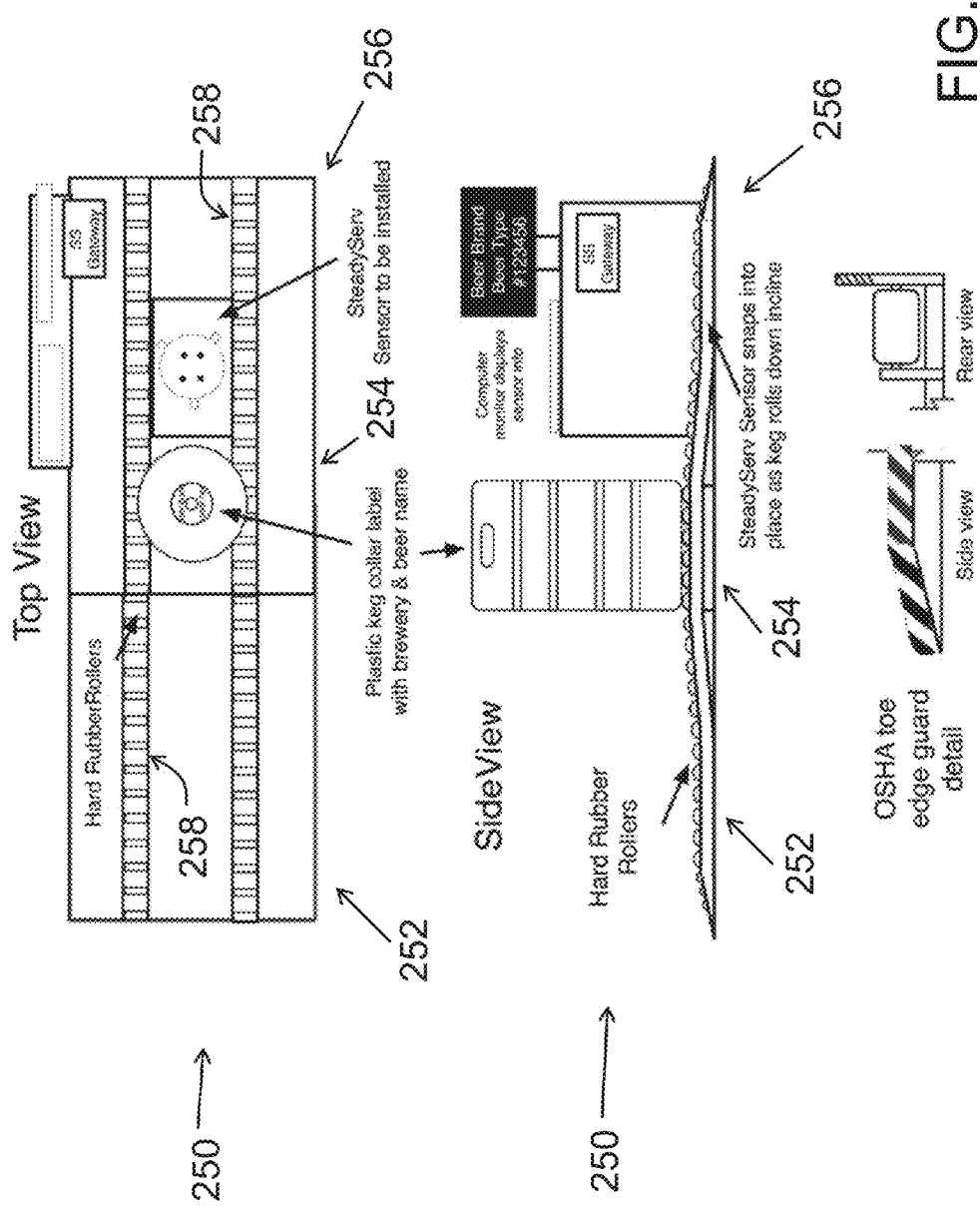
FIG. 7 is a top/side/rear view of a sensor installation apparatus for use in various embodiments.

The keg installer 250 is both a mechanical installer of the keg sensor/transmitter plus is a point at which a warehouse worker can check to be sure that the keg on which he is installing the keg sensor/transmitter matches the Order Pick List. As shown in FIG. 7, a small computer and monitor can be mounted to the keg installer 250. In addition, an uplink/gateway can be mounted on the keg installer 250. This uplink/gateway can have a desensitized receive antenna so that it only receives the keg sensor/transmitter that is being installed onto the keg. As the worker rolls the keg through the installation process, they can perform a visual check to make sure that the content of the keg they have in front of them on the Installer matches what the SaaS system says it should be, plus it matches the Order Pick List. That Order Pick List in some embodiments can be a piece of paper with the order written on it, while in other embodiments the SaaS system can have an EDI (Electronic Data Interface) connection to the beer distributor's inventory system.

So, for example, the keg that is being rolled onto the Installer may have a paper keg collar. A paper keg collar clipped on a keg's top valve is a common way of identifying the contents of a keg. The worker looks at the keg collar and sees that the beer in the keg is identified as "Bell's Founder's Ale". As the worker installs the keg sensor/transmitter the unit transmits its serial number as KS1234 thru the uplink/gateway. The SaaS application displays on the computer monitor that the sensor is associated to the SKU for "Bell's Founder's Ale," and that confirms the correct Sensor Transmitter is being put on the correct keg. The SaaS Software also displays the Order Pick List and the warehouse worker can confirm that it is the correct keg/product to go out.

Figure 8:
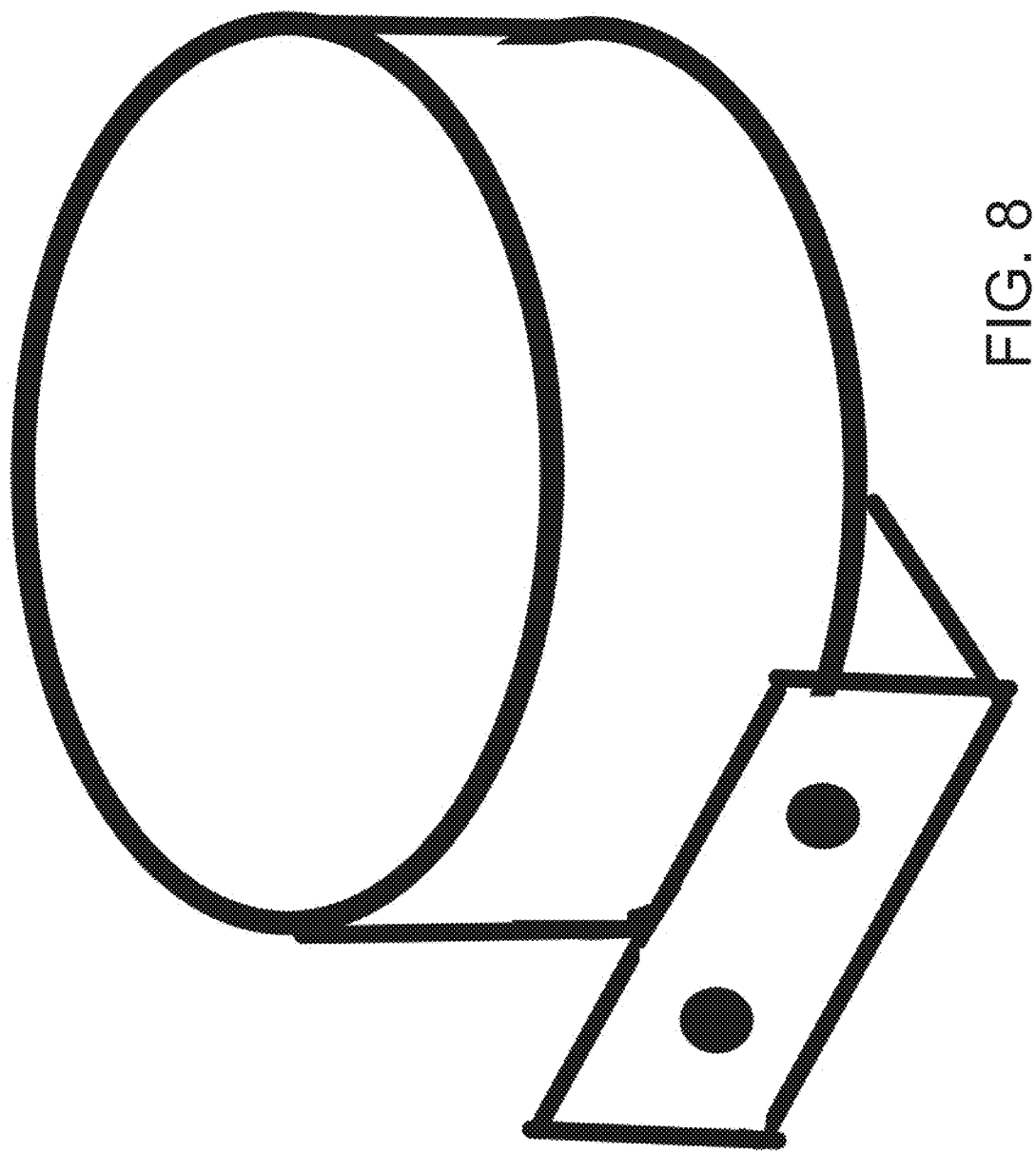
FIG. 8 is a photograph of a sound wave-based keg volume sensor for use in various embodiments.

The top-mounted keg sensor/transmitter shown in FIG. 8 is a sound wave-based unit that can be mounted on the top of a keg in some embodiments of the present system, and can be mounted on the bottom or sides of the keg in other embodiments. The top-mounted keg sensor/transmitter may be mounted with its bottom surface sensor side flush and flat with the top surface of the aluminum keg. To accomplish that flush mounting, a top-mounted keg bracket may be used, such as one made out of aluminum and/or steel. The bracket may be approximately 6 inches in length. At the top of the bracket there can be a "Y"-shaped fork, and at the bottom of the bracket there can be a "T"-shaped end. In the middle can be the actual keg sensor/transmitter, which is approximately 3 inches square in one embodiment. The top-mounted bracket can be designed with a pressure spring, hand lever, and lock. The bracket may be placed on the top of the keg with the "Y" shape up against the keg valve. A branch of the "Y" sits on either side of the valve. The "T"-shaped end can rest in the outer edge of the top of the keg. The bracket can be put into place and the hand lever pushed down, which creates pressure on the spring and flexes out and bows the bracket out and down. The bracket flexes out the "Y" and the "T," and the hand lever locks into place, securing the bracket to the keg with equal and opposing force on the "Y" at the valve and the "T" at the edge of the keg top. The force also pushes the keg sensor/transmitter firmly onto the top of the keg with the downward force. The action of the bracket in this embodiment is similar to the concept behind a snow ski binding. The bracket can be removed by unlocking the lever, the force is removed, and the bracket is free.

The majority of beer kegs used by craft brewers in the county are leased from one of two keg leasing companies. In certain embodiments, agreements with keg leasing companies and with keg manufacturers can allow a more permanent mount to be included on kegs for the top-mounted keg sensor/transmitter.

The design form that may be used for the top-mounted sensor is similar to a large hockey puck. The flat side of the "puck" can sit on top of the keg, pressed against the top surface. In some systems, the data vendor works with keg manufacturers and keg-leasing companies to spot-weld an aluminum bracket to the top of each keg. The top-mounted keg sensor/transmitter would then be attached to the top of the keg by attaching it to this welded bracket. In some embodiments, this design would be very similar to a bayonet-mount camera lens. The round-shaped top-mounted keg sensor/transmitter would have a three-pronged male bayonet mount. The bracket mounted on the top of the keg would have a recessed female bayonet mount. The keg sensor/transmitter would be placed on the top of the mount, and with a one-quarter clockwise twist, the keg sensor/transmitter mount would be securely mounted onto the keg.

Figure 9:
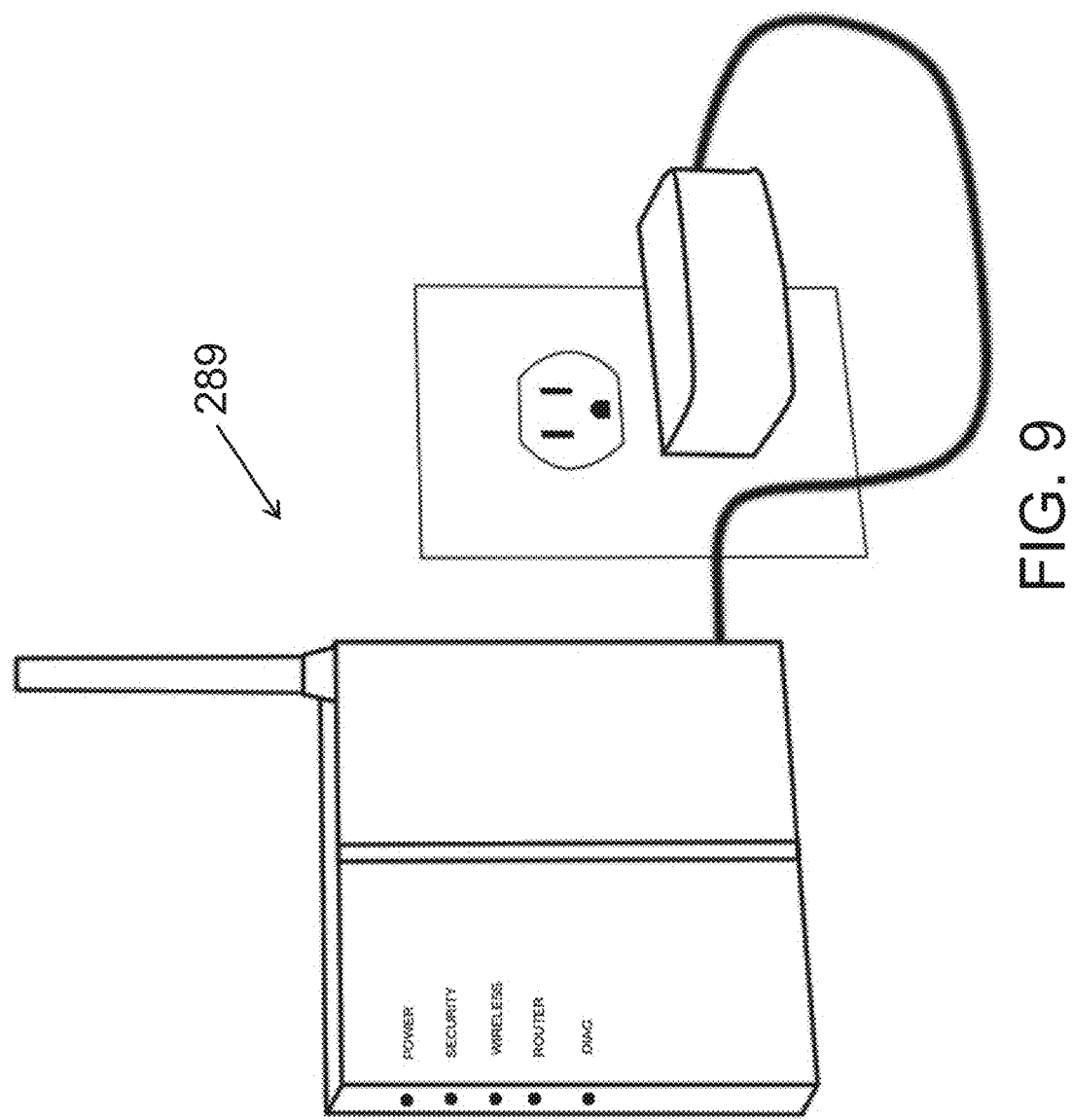
FIG. 9 is a perspective view of an uplink/gateway according to one embodiment.

The uplink/gateway in various embodiments is a self-contained unit that can be mounted on the wall, such as outside of the beer cooler, of an on-premises retailer (bar or restaurant) that contracted with their local beer distributor to use the service described herein. The uplink/gateway can be a moisture-resistant, shock-resistant plastic box that contains radio receivers, computer hardware, computer software, and radio transmitters. Each uplink/gateway can have its own unique serial number that is embedded into the uplink/gateway software. An uplink/gateway 289 according to at least one embodiment is depicted in FIG. 9.

Figure 10A:
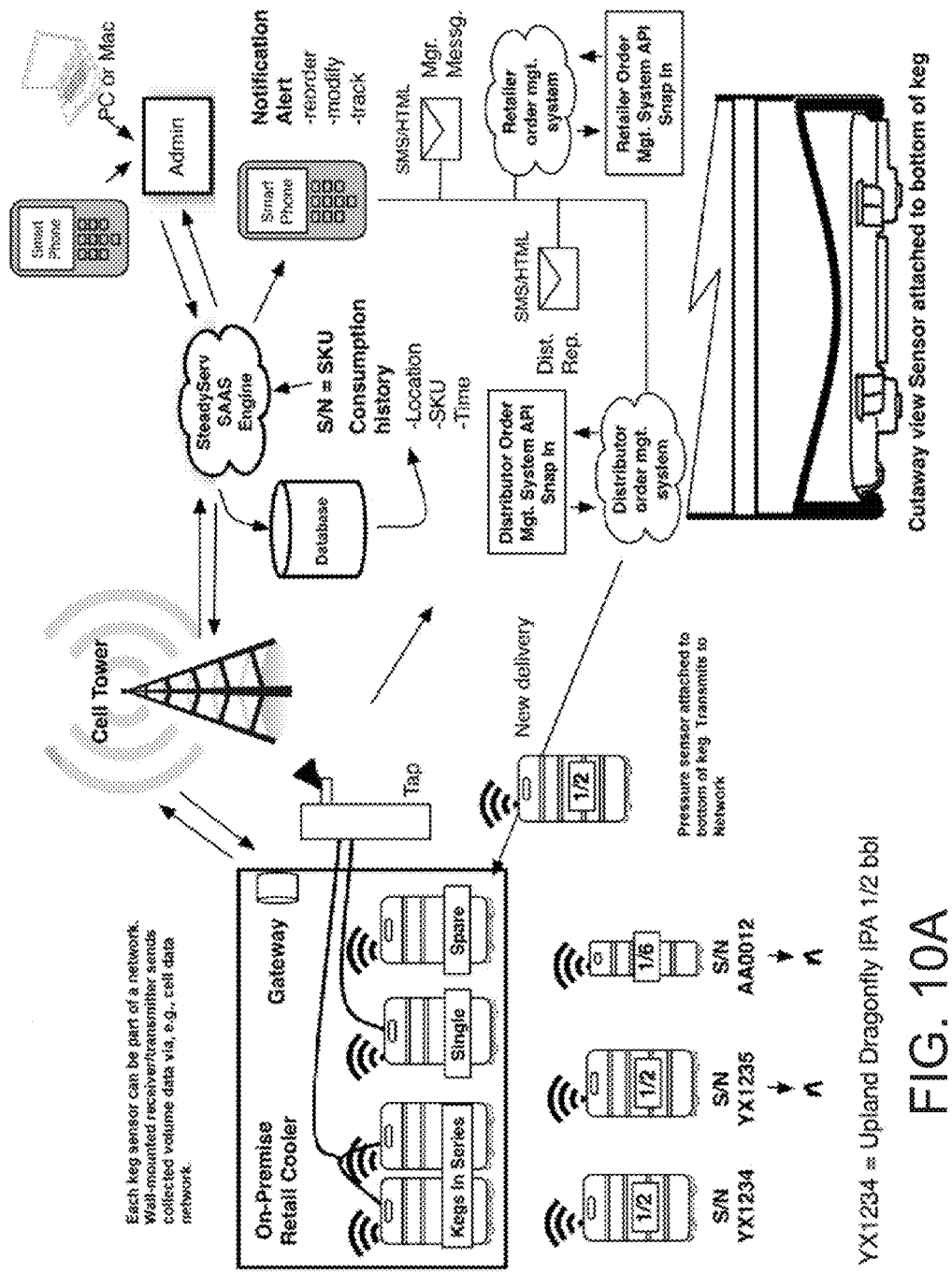
FIG. 10A is a schematic diagram of a bulk beverage information collection, management, processing, and action system according to one embodiment.

The uplink/gateway consists of two major areas and functions in some embodiment. The hardware radio receiver and software stack receives the data transmissions from each keg sensor/transmitter within its range, which are typically the keg sensor/transmitter(s) in the nearby cooler. The receiver receives the data, organizes the data, and tags the data with information unique to the individual uplink/gateway including the unit's unique serial number and version number. Once the receiver and software stack has organized that data, it is sent to a gateway, e.g., a CDMA cell phone gateway. This overall system is illustrated in FIG. 10A. Information about the contents in each keg may also be communicated to the sensor/transmitter using a separate data storage device (such as an RFID device) attached to the keg, which is paired with and transfers information to the sensor/transmitter for uplink to the larger network.

The CDMA uplink/gateway is a transmitter/receiver that contains both radio hardware and software. The CDMA uplink/gateway in some embodiments can be constructed with specifications provided by a wireless carrier partner, such as Verizon Communications. (In other embodiments, of course, GSM and/or other wireless data transmission protocols are used instead of or in addition to CDMA.) The uplink/gateway can join the carrier's data service by connecting the closest cell phone tower to the on-premise retailer where the uplink/gateway has been placed. The uplink/gateway relays the data from the keg sensor/transmitter(s) that has been collected by the receiver. The CDMA uplink/gateway can communicate with the carrier's network to determine the longitude and latitude of the Gateway and can transmit that data, its software version number, and the data collected by the receiver to software, e.g., SaaS Software.

In some embodiments, after the keg sensor/transmitter is attached to the keg, the keg is delivered to the on-premise retailer, a bar or restaurant that sells draft beer. At the retailer the keg is placed in the retailer's keg cooler. Once the keg is placed in the cooler, it is now in radio range to join a network that includes the keg sensor/transmitter of each keg in the cooler as well as the uplink/gateway. As soon as the keg is placed into the cooler, the keg sensor/transmitter may begin transmitting data. The data transmitted can include the weight parameter (e.g., 0-20) from the sensor, the Sensor Transmitter Serial Number (e.g., #KS1234), the version number of the software (e.g., ver 1.0), and/or keg ID information (e.g., information about the fluid in a keg received from the RFID device associated with the keg). This collection of data is transmitted to the uplink/gateway. The uplink/gateway acts as a conductor collecting data from all keg sensor/transmitters in the cooler and maintains its own serial number (#UG5678) and its own location longitude and latitude data (e.g., latitude: 39.77572 longitude: −86.15569). The uplink/gateway collects Sensor Data then adds its own data that is transmitted via the carrier's CDMA cell phone data network to the SaaS software. So an example data feed would look like:

keg sensor/transmitter sends a data string:
keg_sensor_serial=KS1234&;weight_parameter=10&; keg_sensor_version=1.0&;gate way_version=1.0&;keg_rfid=1234

This data string is received by the uplink/gateway, and the uplink/gateway embedded software adds its data. The combined data string in this example would then be:
uplink_gateway_serial=UG1234&;long=39.77572&; lat=−86.15569&;=5&; keg_sensor_serial=KS1234&; weight_parameter=10&;keg_sensor_version=1.0&;gateway_v ersion=1.0&;keg_rfid=1234

When there are multiple keg sensor/transmitters in a cooler, the combined data string would look like:
uplink_gateway_serial=UG1234&;long=39.77572&; lat=−86.15569&;=5&;keg_sensor_serial=KS1234&; weight_parameter=10&;keg_sensor_version=1.0&;gateway_version=1.0&;keg_rfid=1234; keg_sensor_serial=KS5678&;weight_parameter=4&; keg_sensor_version=1.0&;gateway_version=1.0&; keg_rfid=5678;keg_sensor_serial=K S91011 &;weight_parameter=3&; keg_sensor_version=1.0&;gateway_version=1.0;keg_rfid=9 1011

The data is collected and sent by the uplink/gateway through the CDMA cell data network, then over the Internet to the SaaS software. Upon receipt by the SaaS software, the collected data from the keg sensor/transmitter can be correlated and saved in the database in several different ways.

The keg sensor/transmitter Serial Number may be correlated to an SKU that matches the beer brand and type. The correlation between the Serial Number and SKU has been pre-programmed into the SaaS Database or via the keg RFID device. For example, if Serial Numbers KS0000 through KS1234 have been assigned SKU998877665544, which is beer brand and type "Bell's Founder's Ale," then when the SaaS software receives data from Keg Sensor Serial Number KS1234, the SaaS software writes the data into the database as being associated with that SKU, beer brand and type "Bell's Founder's Ale." The SaaS software can have programmed intelligence that also converts the weight parameter into a percentage of volume. So, for example, if the keg sensor sends a weight measurement of 10 on a scale of 0-20, that means the keg is half-weight, thus half-full. The SaaS software converts weight to volume. 20 is full, 100%. 0 is empty, 0%. The scale of 0-20 is, therefore, converted by the SaaS software to 20 steps of volume in percentage units.

The uplink/gateway can add its data to show the location of not only the Uplink Gateway, but also the location of the keg sensor/transmitters that it is collecting data from in its coolers. As an example, assume that in the SaaS software the uplink/gateway serial number UG1234 has been assigned to the location of retailer "Scotty's Bar and Restaurant." So when the transmission of data from a keg sensor/transmitter is made through the uplink/gateway, the location of the keg is known. So, for example, a keg sensor/transmitter KS1234 with weight parameter 10 may be transmitted to the SaaS software thru uplink/gateway UG1234. The SaaS Software has presumably already stored the location data of the uplink/gateway, the association of the keg sensor/transmitter to SKU Beer Type, and the conversion of weight to volume. When each transmission of data occurs in this embodiment, the SaaS database assigns a date and time stamp converted from UTC (Coordinated Universal Time) to local time. So when the transmission of data occurs, and the SaaS software receives the data, the data is converted to report that the particular keg of "Bell's Founder's Ale" currently located at "Scotty's Bar and Restaurant" is 50% full at 10 PM today.

KS1234=Bell's Founder's Ale
UG 1234=Scotty's Bar and Restaurant
Volume=50% (Weight value of 10 converted to %)
Date-Time=10.31.16 10:00 PM The embedded software in the keg sensor/transmitter can have intelligence built in. For example, it can regulate the time factor of how often the data is transmitted from the keg sensor/transmitter to the uplink/gateway. In one example, the software is set to send data every hour time period, but that time period can be changed. The keg sensor/transmitter software has the intelligence to only transmit data if the weight value has changed. In the future, the keg sensor/transmitter can also have the ability to transmit the ambient temperature around the keg (cooler temp) and the keg sensor's remaining battery life as a percentage.

Figure 10B:
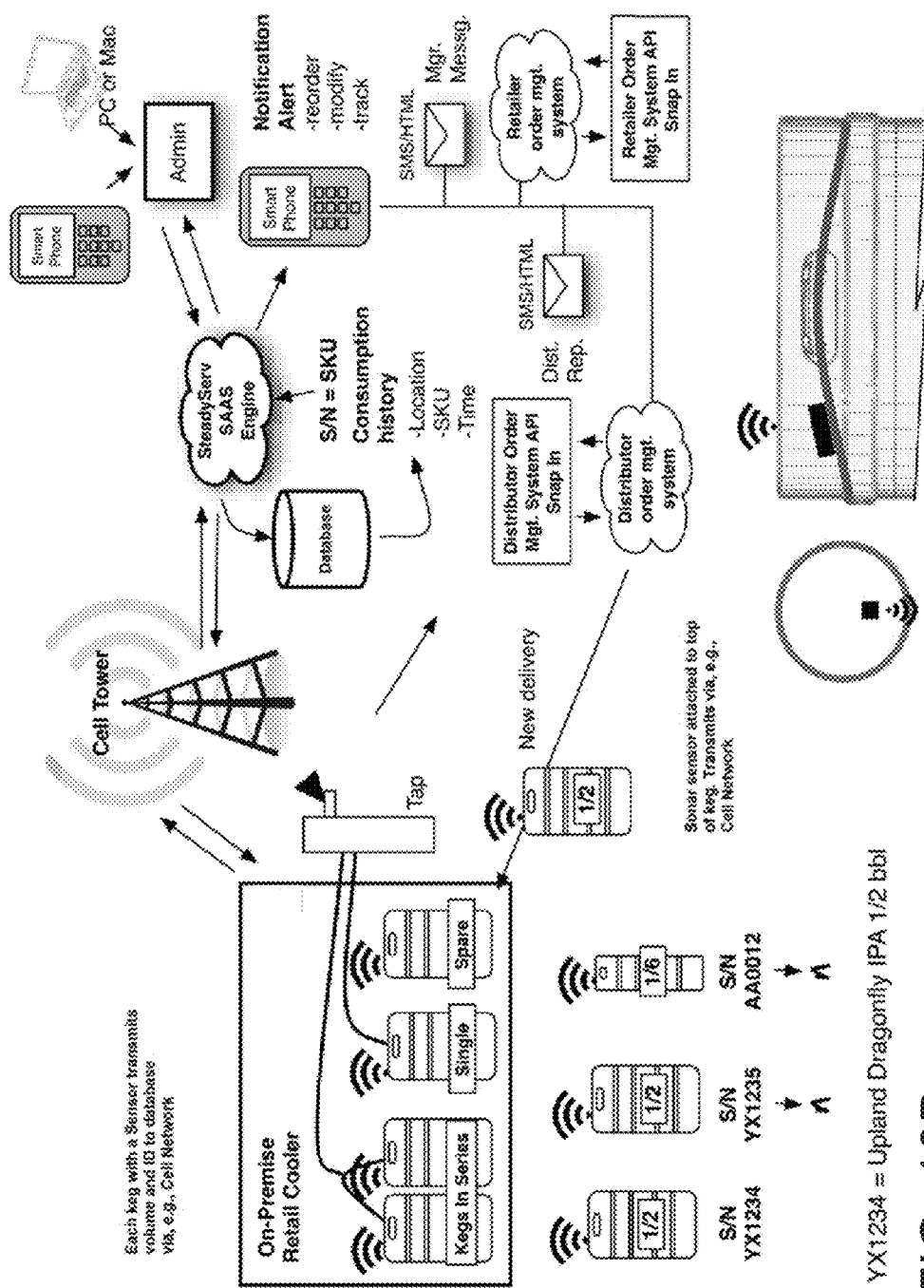
FIG. 10B is a schematic diagram of a bulk beverage information collection, management, processing, and action system according to another embodiment.

One design of the keg sensor/transmitter uses short-range radio technology (e.g., ZigBee and/or Bluetooth) to connect and send data thru the uplink/gateway. An alternative design, an example of which is illustrated in FIG. 10B, eliminates the uplink/gateway step by providing the keg sensor/transmitter itself a direct CDMA cell data connection so that the keg sensor/transmitter can transmit its data directly to the SaaS Software.

Still further versions of the Keg/Sensor Transmitter can change from the bottom-mounted weight sensor, to a top-mounted sensor. The top-mounted keg sensor/transmitter uses sound wave technology to send a sound wave through the top of the keg. The sound wave can bounce off the top of the liquid (beer) and return to the keg sensor/transmitter. The interval of time between the time at which the sound wave was sent and the time at which the return sound wave was received would be measured. This measurement would be transmitted to the SaaS Software, which can convert the time interval into a percentage of volume of the beer remaining. A short time interval would mean a fuller keg. A longer time would mean an emptier keg.

Figure 11:
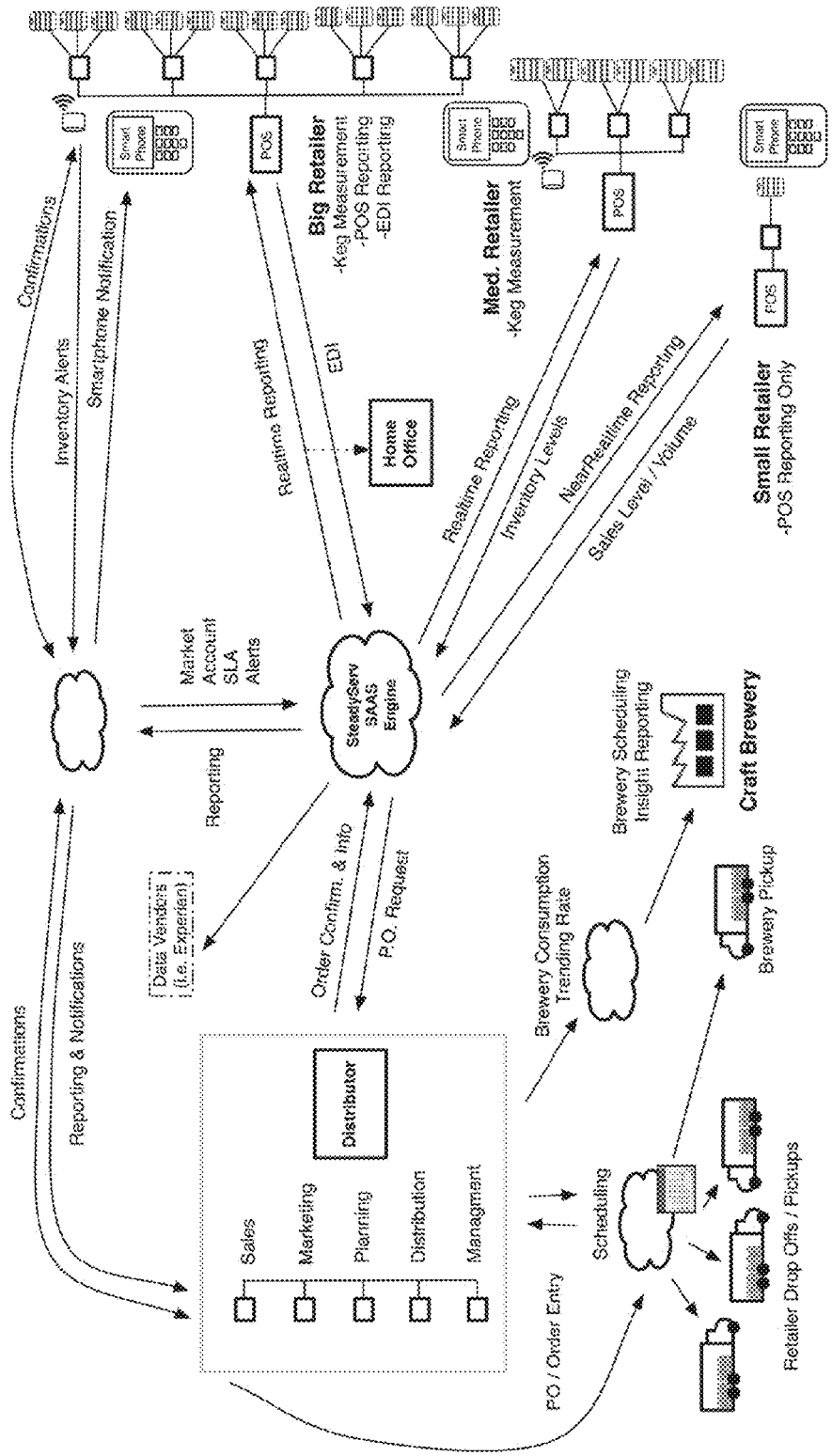
FIG. 11 is a schematic diagram of distribution, reporting, ordering, and processing of bulk beverage information according to one embodiment of the present disclosure.

Now that we have the basic keg volume, date time, and location data coming from the keg sensor/transmitter through the uplink/gateway into the SaaS Software database, we can talk about how we act upon the gathered data. FIG. 11 provides a schematic illustration of some such actions, while others will occur to those skilled in the art in view of this disclosure.

There are several levels of use of the gathered data that in the illustrated embodiments is now in the SaaS Software. The SaaS Software can be set up with individual accounts for each Bar and Restaurant retailer using the service. A representative of the retailer can set up accounts for each individual in their organization who interacts with keg beer. The setup process can include adding each individual's smart phone/mobile phone number. The representative can set up rules based on their organization's individual needs. One function in the day-to-day operation can be to be able to have an insight into the current status of their keg beer inventory. The representative can log onto the SaaS software, then review current inventory and set rules for alerts based on depletion rates of keg beer. In various embodiments, these alerts can take on the form of SMS text sent to mobile phones, popup push alerts that are part of iPhone, Android and other smart phone formats, emails sent out, recorded voice alerts sent to phones, and other forms that will occur to those skilled in the relevant technologies. The alerts can be sent to retail workers based on their current location. The system software can take advantage of the location-based service built into each smart phone. The worker may only get alerts if they are in the geographical longitude and latitude area that has already been defined in the SaaS database by the recording of the uplink/gateway assigned to their place of work. This can assure that workers will not get alerts during their off-shift hours. A manager who would like to get alerts when they are off-site from their retail location can override this function.

In other embodiments, alerts take the form of visual flashing lights and integration into other software in the restaurant including, but not limited to, POS terminals (Point of Sale, electronic "Cash Registers").

The retail representative can assign a value to certain beer brands and types and customize alert based on the value of the beer, that is, the importance of not running out of that beer. For example, the retailer might not value the "Stroh's Light" beer as much as the "Bell's Founder's Ale." So the retailer representative might set up the SaaS software to automatically alert the designated retailer representative when the Stroh's reaches 10% remaining, while the more valuable Bell's would automatically alert when the remaining beer registers in the SaaS system as 40% remaining. In alternative embodiments, patterns in the rate of consumption of each product are taken into account, and depletion events are forecasted so that alerts can be raised and orders can be placed "just in time."

When an alert is sent to the retailer, there can be multiple paths (e.g., four paths) that they can use to re-order the keg that is running low. If the alert comes to the retailer's phone, they can re-order by sending an SMS text message directly to their beer distributor sales rep, or by sending an SMS text message to an SMS gateway that is controlled by the system vendor and connected by EDI (Electronic Data Interchange) into the beer distributor's ordering system. Another option can be to activate a button in the user interface to initiate a voice call to their beer distributor's sales rep. There can also be iPhone and Android smartphone applications that have a re-ordering function built-in, connecting by EDI to the beer distributor's ordering system. The interface of the smartphone application could have a visual alert with the button option "re-order now," which the retailer can choose.

In some embodiments, the retailer can set their account to have the SaaS software automatically submit re-orders on kegs based on rules they set for each brand and type of beer. For example they can set a rule to automatically re-order "Bell's Founder's Ale" if the depletion level has dropped below 40% and the day of the week is Wednesday thru Friday.

Retailers can have standard reports accessible to them via the SaaS web-based platform or mobile app. These reports can include current and past inventory reports, current and past keg depletion rates, and other reports key to their operation.

Beer distributor sales representatives can see all of their accounts and the current state of each retailer's keg inventory. The sales representative can see when alerts on low kegs were sent out to retailers, who the alert was sent out to, and what action (if any) was taken by the retailer to re-order the depleting, or depleted, keg. The management of the beer distributor can have a near-real-time view of current beer depletion across all of their retail accounts. This near-real-time data can allow them to more efficiently control their inventory of kegs in their warehouse based on trends in usage.

The near-real-time data that the presently disclosed process may be collecting can also be used by breweries to determine what beers are being sold and at what rate. They then can adjust what beers they are planning to brew and in what quantity they brew the beer. In the case of large breweries, they can adjust the purchasing of the ingredients of beer components on the grain futures market. The system vendor can also sell data to marketing data firms who track trends in consumer consumption.

As will be appreciated by those skilled in the art, and API (Application Programming Interface) can be developed to allow other applications to access system data for real time software applications.

An example would be a consumer "Beer Finder" smartphone application. The smartphone application would integrate into the operation system of the smartphone and be able to find the phone's exact location in longitude and latitude. The app would then send a query the SaaS Database thru the API to find out the closest keg sensor/transmitter and uplink/gateway to the person using the smartphone app. Near real time data of volume of a brand and type of a beer as well as its longitude and latitude location has already been recorded from the keg sensor/transmitter and uplink/gateway. So the smartphone app could show that "Bell's Founder's Ales" is at "Scotty's Bar and Restaurant," which is X miles away from your location. The location could be plotted on a map. Plus the app could get the data that the keg is currently 50% full and do the math to determine (and display) that there are "currently 110 pints left" of this beer.

Simple social media integration services can be created for the retailer using techniques understood by those skilled in the art. Using the data already in the SaaS Database, social media alerts can be sent automatically based on rules set by the retailer. That retailer can be prompted during their initial SaaS web setup to have the option of sending a TWITTER tweet or FACEBOOK status update when a new keg of beer is tapped. They would enter in their social media account name and password, then choose a template social message like:

"Just wanted to let you know that we just tapped a new keg of <BEER BRAND AND TYPE INSERTED HERE> at <NAME OF BAR-RESTAURANT LOCATION>. Come on down and get a pint now! #greatbeer"

For example, say that retailer was "Scotty's Bar and Restaurant," and they have a new, full and untapped, keg of "Bell's Founder's Ale" in their cooler. This keg has a keg sensor/transmitter that is reporting a weight value of 20, which translates into a 100% full keg. Once that keg is tapped, the beer is flowing and being sold, and is now reporting a value of 19 the Twitter Tweet or Facebook Status Update is sent out:

"Just wanted to let you know that we just tapped a new keg of Bell's Founder's Ale at Scotty's Bar and Restaurant North Side. Come on down and get a pint now! #greatbeer"

Other embodiments include integration into POS terminals (Point of Sale, electronic "Cash Registers"). These POS terminals have their own APIs (Application Programming Interface) that would allow the SaaS Software to query into the POS database to extract data. This extracted data would then be added to the SaaS Database to be used for several purposes. For a given retailer, keg sensor/transmitters may be on some but not all kegs in that retailer's cooler. By pulling out sales data for a tap that is serving a given brand and type of beer, but is coming from a keg that does not have a keg sensor/transmitter, the SaaS application can estimate the keg depletion and the same alert rules and actions of re-order can be applied. In addition, a retailer can look at the depletion rate of a keg with a keg sensor/transmitter and compare it with the POS data on that same keg as it is reported by the POS system. By comparing the real volume data obtained from the present system with the reported sales data, a retailer can assess waste and shrinkage on that tap from "free pours" (keg beer poured to patrons to gain tips, or pours to employee friends).

The keg sensor/transmitter can be used in some embodiments to pinpoint the location of individual kegs in a warehouse.

Figure 12:
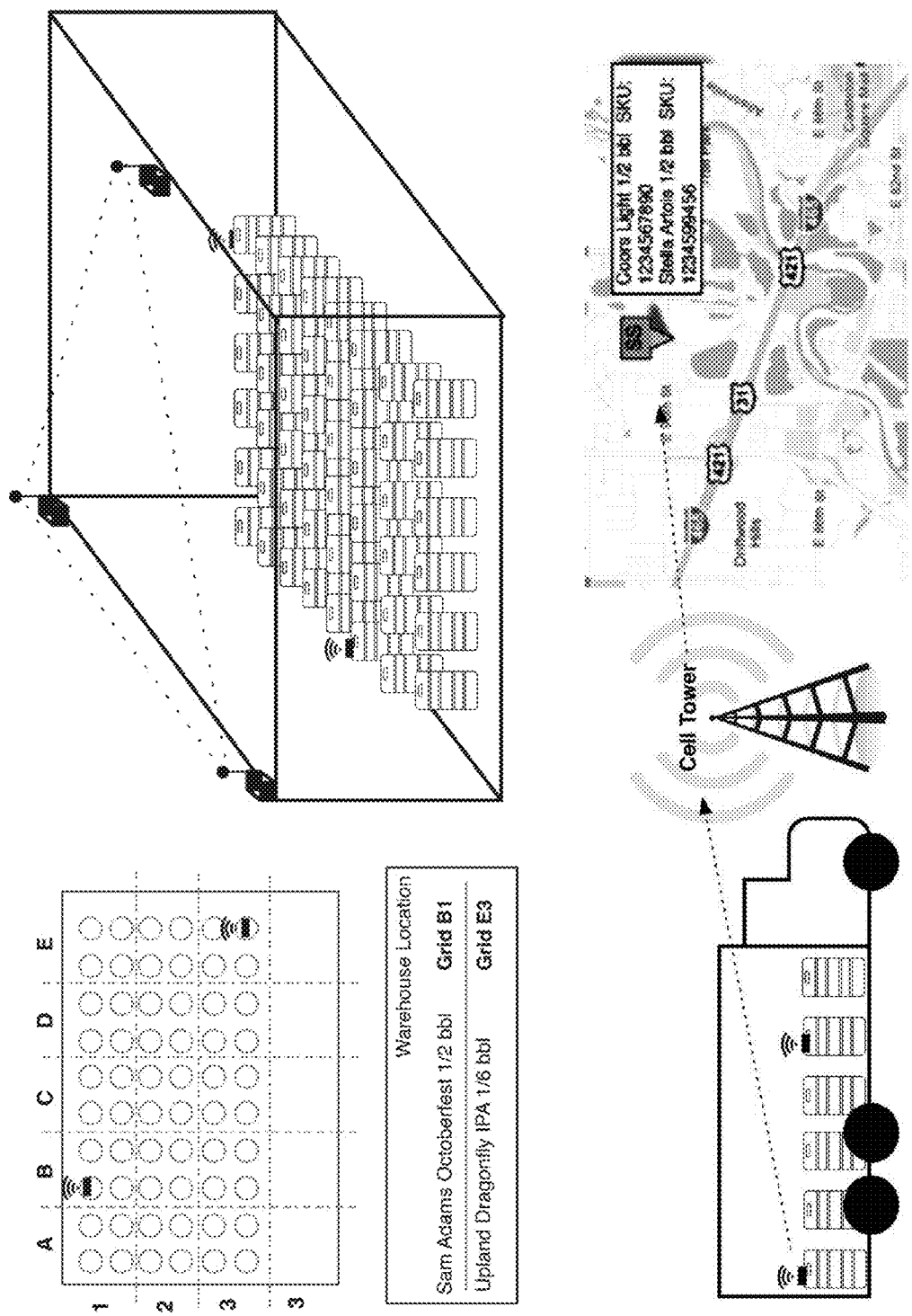
FIG. 12 illustrates a keg location monitoring system in yet another embodiment.

Current technology for radio transmission and reception allows for location of a transmitted signal in a wide area. Using triangulation plotting a transmitter like the one on a keg sensor/transmitter would be a broad area. In the embodiments described in previous sections of this document, the Sensor is put on a keg as it leaves the warehouse to be delivered to the retailer. In other embodiments, however, the sensor could be put on the keg as it is delivered from the brewery to the beer distributor warehouse. As shown in FIG. 12, additional location technologies, whether now existing (such as RFID) or hereafter developed, in such embodiments allow for pinpoint location of a keg in a warehouse. The location can be shown on a computer-drawn map of the warehouse showing the X-axis and Y-axis location of an individual keg, but also the Z-axis. The Z-axis is the height, as when the keg is stacked up on a shelf. So in the future if a beer distributor is missing a keg, or group of kegs, by using the present system they could locate the keg. There could be a plot on a screen that shows the missing keg is in row 2, aisle 3, shelf 3.

In some embodiments the keg sensor/transmitter can be a direct CDMA or other cellular data connection. Using the longitude and latitude data from each wireless-data-equipped keg sensor/transmitter, each keg can be located when on the road for delivery and located after delivery to determine whether the individual keg has been delivered to the correct location or delivered in error to the wrong location.

Other uses would include bulk containers of soda, such as COCA-COLA or PEPSI, and containers of home-delivered water, such as ICE MOUNTAIN and CULLIGAN.

There are several brands of home keg coolers marketed to consumers. The keg sensor/transmitter could be integrated into the design of these home coolers to measure the remaining beer and alert the consumer.

Figure 15:
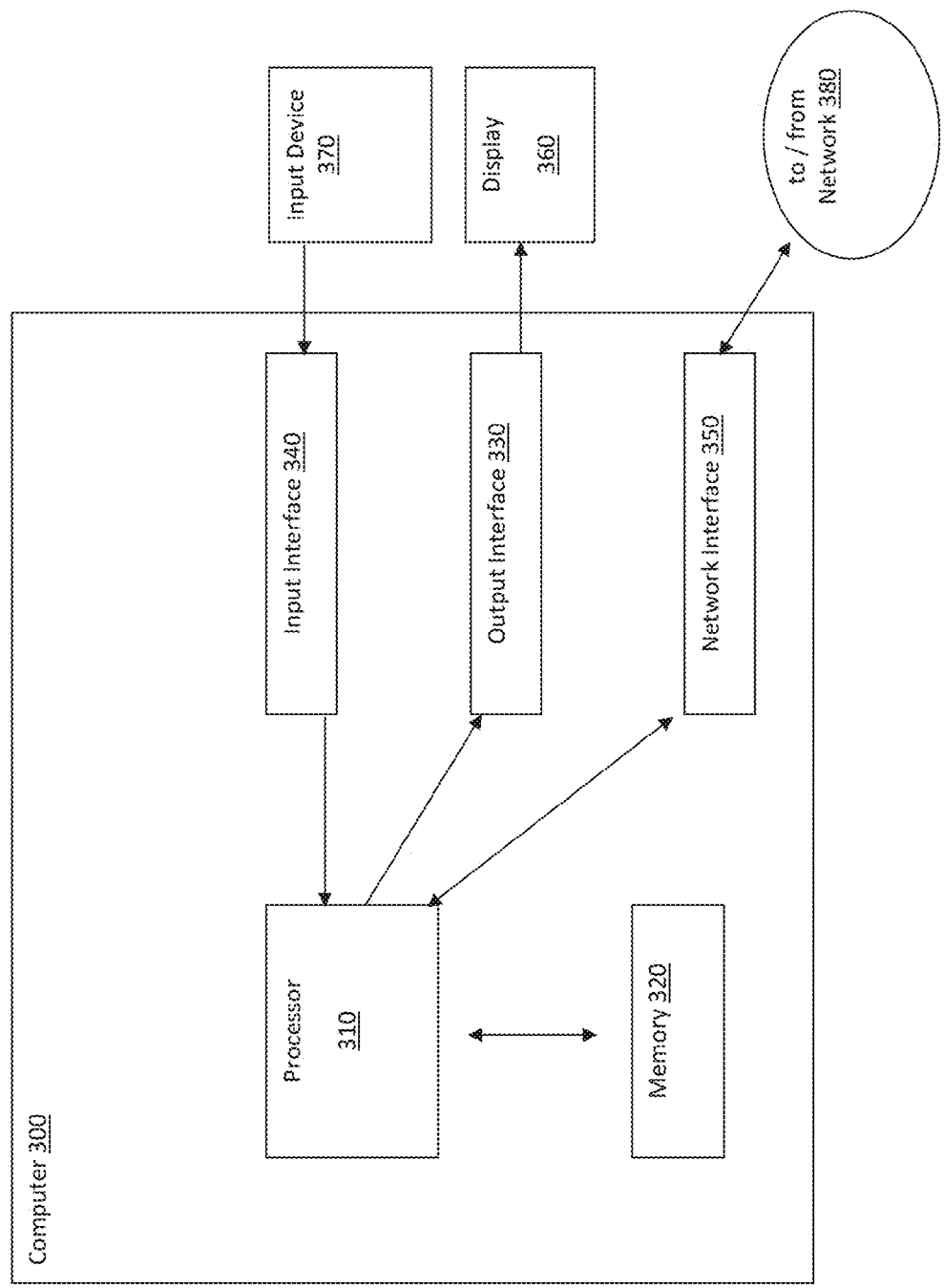
FIG. 15 is a schematic diagram of a computer used in various embodiments.

Computers (which may be used as servers, clients, resources, interface components, and the like) utilized in conjunction with embodiments described herein can generally take the form shown in FIG. 15. Computer 300, as this example will generically be referred to, includes processor 310 in communication with memory 320, output interface 330, input interface 340, and network interface 350. Power, ground, clock, and other signals and circuitry are omitted for clarity, but will be understood and easily implemented by those skilled in the art.

With continuing reference to FIG. 15, network interface 350 in this embodiment connects computer 300 to a data network (such as a direct or indirect connection to a server and/or a network 380) for communication of data between computer 300 and other devices attached to the network. Input interface 340 manages communication between processor 310 and one or more input devices 370, for example, microphones, pushbuttons, UARTs, IR and/or RF receivers or transceivers, decoders, or other devices, as well as traditional keyboard and mouse devices. Output interface 330 (which may take the form of a user interface) provides a video signal to display 360, and may provide signals to one or more additional output devices such as LEDs, LCDs, or audio output devices, or a combination of these and other output devices and techniques as will occur to those skilled in the art.

Processor 310 in some embodiments is a microcontroller or general purpose microprocessor that reads its program from memory 320. Processor 310 may be comprised of one or more components configured as a single unit. Alternatively, when of a multi-component form, processor 310 may have one or more components located remotely relative to the others. One or more components of processor 310 may be of the electronic variety including digital circuitry, analog circuitry, or both. In one embodiment, processor 310 is of a conventional, integrated circuit microprocessor arrangement, such as one or more CORE i7 HEXA processors from INTEL Corporation of 2200 Mission College Boulevard, Santa Clara, Calif. 95052, USA, or ATHLON or PHENOM processors from Advanced Micro Devices, One AMD Place, Sunnyvale, Calif. 94088, USA, or POWER8 processors from IBM Corporation, 1 New Orchard Road, Armonk, N.Y. 10504, USA. In alternative embodiments, one or more application-specific integrated circuits (ASICs), reduced instruction-set computing (RISC) processors, general-purpose microprocessors, programmable logic arrays, or other devices may be used alone or in combination as will occur to those skilled in the art.

Likewise, memory 320 in various embodiments includes one or more types such as solid-state electronic memory, magnetic memory, or optical memory, just to name a few. By way of non-limiting example, memory 320 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; or a plurality and/or combination of these memory types. Also, memory 320 may be volatile, nonvolatile, or a hybrid combination of volatile and nonvolatile varieties. Memory 320 in various embodiments is encoded with programming instructions executable by processor 310 to perform the automated methods disclosed herein.

Although a keg is a particular type of container and is typically filled with a fluid (such as beer), alternate embodiments of the invention measure the quantity of other materials (which may not be a fluid) contained within other types of containers.

It should be appreciated by one of ordinary skill in the art that a receiver as referred to herein includes devices that transmit and receive electromagnetic signals, sometimes referred to as transceivers.

Various Aspects of Different Embodiments of the Present Disclosure are Expressed in Paragraphs X1, X2, X3, X4 and X5 as Follows:

X1. One embodiment of the present disclosure comprises: attaching a wireless electronic communication device to a container with liquid, the wireless electronic communication device being encoded with information relating to a characteristic of the liquid within the container; attaching a sensor/transmitter to the container; transferring information relating to a characteristic of the liquid within the container from the wireless electronic communication device to the sensor/transmitter; determining the quantity of the fluid within the container with the sensor/transmitter; and transmitting information related to the weight of the container and the type of liquid within the container from the sensor/transmitter to a computer database via a wireless network.

X2. Another embodiment of the present disclosure comprises: a sensor/transmitter adapted to attach to the container, sensor/transmitter including a liquid quantity sensor configured and adapted to detect the amount of liquid within the container, a receiver that receives information related to the liquid in the container from a wireless electronic communication device, and a transmitter that receives information from the receiver and from the liquid quantity sensor, wherein the transmitter transmits information received from the receiver and the liquid quantity sensor to a wireless network.

X3. Another embodiment of the present disclosure comprises: a plurality of wireless electronic communication devices, each encodable with information identifying a characteristic of liquid within a container, each wireless electronic communication device being attachable to a container; a plurality of sensors each attachable to a container, each sensor configured and adapted to measure the quantity of liquid within the container to which the sensor is attached, receive information from one of the plurality of wireless electronic communication devices attached to the same container as each sensor, the information relating to at least one characteristic of the liquid within the container to which the one wireless electronic communication device and the sensor is attached, and transmit information to a wireless network, the transmitted information including information from the wireless electronic communication device including the characteristic of the liquid within the container to which the sensor is attached, and information about the weight of the container to which the sensor is attached; and a computer database that receives and stores information from the plurality of sensors via the wireless network.

X4. An weight sensor, comprising: a housing sized to attach to the bottom of a container, a foot adapted to engage a support surface; and a weight sensing member connected to the housing and to the foot, the weight sensing member sensing at least a portion of the total weight of the container when the housing is connected to the container, the foot is placed on the support surface, and the container is supported above the support surface by the weight sensor.

X5. A weight sensor for a keg, comprising: a housing sized to fit within the false bottom of a keg and attach to the keg; a foot adapted to engage a support surface; and a weight sensing member connected to the housing and to the foot, the weight sensing member sensing at least a portion of the total weight of the keg when the housing is connected to the keg, the foot is placed on the support surface, and the keg is supported above the support surface by the weight sensor.

Yet Other Embodiments Include the Features Described in any of the Previous Statements X1, X2, X3, X4 or X5, as Combined with One or More of the Following Aspects:

Wherein one or more containers is a keg.

Attaching a sensor/transmitter to the bottom of the keg.

Weighing a keg with the sensor/transmitter.

Wherein the sensor/transmitter is adapted to fit within and attach to the inner diameter of a keg bottom, the sensor/transmitter protruding below the bottom of a keg when the keg is upright.

Wherein the sensor/transmitter includes an attachment clip adapted to engage a portion of the keg bottom and inhibit the sensor/transmitter from detaching from the keg when the keg is raised above a support surface.

Wherein the sensor/transmitter includes an abutment surface adapted to abut a surface of the keg and support a keg above a support surface when the sensor/transmitter is attached to the bottom of the keg and placed on a support surface.

Wherein the liquid quantity sensor is a weight sensor.

Wherein the liquid quantity sensor is a weight sensor configured and adapted to contact a support surface and measure the weight of a keg when the sensor/transmitter is attached to the bottom of a keg and placed on a support surface.

Wherein each of the plurality of sensors is attachable to the bottom of a keg.

Wherein each sensor is configured and adapted to measure the weight of the container to which the sensor is attached.

Positioning the wireless electronic communication device within five (5) feet of the sensor/transmitter, and wherein said transferring information relating to a characteristic of the liquid within the keg from the wireless electronic communication device to the sensor/transmitter occurs after said positioning.

Positioning the wireless electronic communication device within one (1) foot of the sensor/transmitter, and wherein said transferring information relating to a characteristic of the liquid within the keg from the wireless electronic communication device to the sensor/transmitter occurs after said positioning.

Determining the quantity of fluid in the keg using the information related to the weight of the keg.

Transmitting information related to the quantity of fluid in the keg to a user interface.

Receiving information with the sensor/transmitter from the computer database via the wireless network.

Wherein attaching a wireless electronic communication device to a container includes attaching an RFID tag to a hand hold aperture of a keg.

Wherein attaching a sensor/transmitter to a container includes attaching the sensor/transmitter to the inside of a keg's false bottom.

Wherein the wireless communication device is encoded with information relating to the location of the keg.

Wherein said attaching a wireless electronic communication device to a container includes attaching an RFID tag to the container.

Attaching a plurality of wireless electronic communication device to a plurality of containers with liquid, each wireless electronic device being attached to a separate container, each wireless electronic communication device being encoded with information relating to a characteristic of the liquid within the container to which the wireless electronic communication device is attached.

Attaching a plurality of sensor/transmitters to a plurality of containers, each sensor/transmitter being attached to a separate container.

Attaching a plurality of sensor/transmitters to the bottom of a plurality of kegs, each sensor/transmitter being attached to a separate keg.

Transferring information relating to a characteristic of the liquid within each of a plurality of containers from each of the wireless electronic communication device attached to a container to the sensor/transmitter attached to the same container.

Transferring information relating to a characteristic of the liquid within each of a plurality of kegs from each of the wireless electronic communication device attached to a keg to the sensor/transmitter attached to the same keg.

Weighing each of the plurality of containers with the sensor/transmitter attached to each container.

Weighing each of the plurality of kegs with the sensor/transmitter attached to each keg.

Transmitting information related to the weight of each of the plurality of containers and the type of liquid within each of the plurality of containers from the sensor/transmitter attached to each container to a computer database via a wireless network.

Transmitting information related to the weight of each of the plurality of kegs and the type of liquid within each of the plurality of kegs from the sensor/transmitter attached to each keg to a computer database via a wireless network.

Wherein each sensor/transmitter transmits the information to an uplink/gateway, and wherein the uplink/gateway transmits the information to the wireless network.

Wherein the receiver receives information related to the liquid in the container from an wireless electronic communication device attached to the container when the receiver and the wireless electronic communication device are within five (5) feet of one another.

Wherein the receiver receives information related to the liquid in the container from an wireless electronic communication device attached to the container when the receiver and the wireless electronic communication device are within one (1) foot of one another.

Wherein the sensor/transmitter includes four (4) weight sensors configured and adapted to contact the support surface and measure the weight of a container when the sensor/transmitter is attached to the bottom of a container and placed on a support surface;

Wherein the sensor/transmitter includes five (5) attachment clips, each adapted to engage a portion of the container bottom and inhibit the sensor/transmitter from detaching from the container when the container is raised above a support surface;

Wherein the sensor/transmitter includes a pairing actuator and a pairing indicator, wherein said pairing indicator indicates when the receiver pairs with a wireless electronic communication device encoded with information relating to a characteristic of the fluid within a container.

Wherein the pairing actuator is a button.

Wherein the pairing indicator is a light.

Wherein the wireless electronic communication device is an RFID device.

Wherein the wireless electronic communication device is an RFID tag.

Wherein one or more of the sensor/transmitters (or sensors) is ring-shaped.

Wherein one or more attachment clips are configured and adapted to connect to and disconnect from a container by hand.

Wherein the sensor/transmitter includes a battery compartment for storing a battery and connecting a battery stored within the compartment to power the weight sensor, receiver and transmitter.

Wherein each of the one or more wireless electronic communication devices is an RFID tag attachable by hand to a hand hold aperture in a keg.

Wherein each of the one or more sensors are configured and adapted to be attached and detached from inside the hidden bottom of a keg by hand.

Wherein each of one or more sensors is configured and adapted to pair with a wireless electronic communication device when the sensor is within five (5) feet of the wireless electronic communication device and a user actuates the pairing, each of the plurality of sensors including an pair indicator indicating when the sensor and a wireless electronic communication device are paired.

Wherein each of one or more sensors is configured and adapted to pair with a wireless electronic communication device when the sensor is within one (1) foot of the wireless electronic communication device and a user actuates the pairing, each of the plurality of sensors including an pair indicator indicating when the sensor and a wireless electronic communication device are paired.

Wherein a sensor includes a transmitter for communicating with a wireless network.

Wherein a sensor/transmitter includes a transmitter for communicating with a wireless network.

Wherein the housing includes a connecting member that connects to the keg (or container) when the weight sensor is connected to the keg (or container), and where in the connecting member may be actuated by hand to remove the weight sensor by hand from the keg (or container).

Wherein the connecting member is a clip that engages the lip near the bottom of the keg (or container).

Wherein the weight sensing member includes at least one piezoelectric member.

A transmitter connected to the housing and in communication with the weight sensing member, the transmitter configured and adapted to transmit information related to the weight of the keg (or container) received from the weight sensing member to a wireless network.

A receiver connected to the housing and in communication with the transmitter, wherein the receiver is configured and adapted to receive information related to a characteristic of the fluid within the keg (or container) and communicate this information to the transmitter.

A pairing switch connected to the housing, wherein actuation of the pairing switch results in the receiver pairing with and receiving information about the fluid in the keg (or container) from an identification device.

A pairing light, wherein the pairing light illuminates when the receiver and the identification device are paired.

Wherein the housing is round with a surface that abuts a bottom surface of the keg (or container).

Wherein the housing is ring-shaped with a surface that abuts a bottom surface of the keg (or container).

Wherein the housing includes indentations along a portion of the inner circumference of the ring, the portion being less than the entire inner circumference of the ring.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A keg sensor/transmitter comprising:
   a housing configured to be installed to the keg by being mounted to the bottom of the keg the housing comprising:
   a pressure sensor configured to determine an amount of liquid within the keg, the pressure sensor configured to receive a first wake up schedule including a first rate to wake up the pressure sensor for communication with a database; and,
   a transmitter coupled to the pressure sensor, the transmitter configured to transmit an amount of the liquid within the keg,
   wherein the pressure sensor is further configured to receive a second wake up schedule including a second rate to wake up the pressure sensor for communication with the database, the second rate based partly on information regarding a consumption of the liquid within the keg from the database,
   wherein the transmitter is further configured to transmit an updated amount of the liquid with the keg at the second rate according to the second wake UP schedule based at least partly on the updated amount of the liquid within the keg relative to the amount of the liquid within the keg, the updated amount of the liquid within the keg received from the pressure sensor.

2. The device of claim 1, wherein said housing further includes memory adapted for storing identification data for identifying the keg sensor/transmitter; and
   wherein said transmitter is adapted to wirelessly transmit data strings which include said identification data and the amount of liquid within the keg.

3. The device of claim 1, wherein the pressure sensor is further configured to alternate between a sleep mode and a transfer mode based at least partly on the first wake up schedule or the second wake up schedule.

4. A system, comprising:
   a sensor coupled to a first keg, the sensor for sensing a first keg value corresponding to a volume of beer in the first keg;
   a communication gateway configured to receive keg values and device serial numbers from a plurality of kegs including the first keg, wherein the communication gateway is configured to receive information regarding consumption of the volume of beer in the first keg relative to consumption of the volume of beer in a second keg of the plurality of kegs; and
   a transmitter configured to transmit the first keg value to the communication gateway,
   wherein the sensor is configured to receive a first wake up schedule including a first rate from the communication gateway, and wherein the sensor is configured to receive a second wake up schedule including a second rate from the communication gateway, the second rate based partly on the information regarding the consumption of the volume of beer in the first keg relative to the consumption of the volume of beer in the second keg.

5. The system of claim 4, wherein the sensor is further configured to wake up according to the first wake up schedule at the first rate and transmit the first keg value and a device serial number to the communication gateway via the transmitter.

6. The system of claim 4, wherein the sensor is configured to wake up according to the second wake up schedule at the second rate and transmit an updated first keg value and the device serial number to the communication gateway via the transmitter.

7. The system of claim 4, further comprising:
   a database storing information regarding the plurality of kegs, the database configured to receive information regarding the plurality of kegs from the communication gateway and to transmit wake up schedules to the plurality of kegs via the communication gateway.

8. The system of claim 7, wherein the database is configured to execute instructions that, when executed by a processor, compare the first keg value to a second keg value to generate the information regarding the consumption of the volume of beer in the first keg relative to the consumption of the volume of beer in the second keg and to generate the wake up schedules including the first wake up schedule and the second wake up schedule.

9. The system of claim 8, wherein the information regarding the plurality of kegs includes a type/brand of beer in each keg of the plurality of kegs, wherein the instructions further include comparing the first keg value to the second keg value based on the type/brand of beer in each respective keg.

10. The system of claim 4, wherein the first rate corresponds to an initial rate of one hour, wherein the second rate corresponds to a rate of twenty minutes.

11. A method, comprising:
    receiving a plurality of keg weights, each keg weight associated with a corresponding keg of a plurality of kegs, each keg weight received at a first wake up time according to a first wake up rate from a corresponding weight sensor of each keg;
    determining that a first keg of the plurality of keg is being consumed at a first consumption rate faster than a second keg of the plurality of kegs at a second consumption rate based partly on a first keg weight of the first keg relative to a second keg weight of the second keg;
    generating a second wake up rate based on the determination that the first keg is being consumed at the first consumption rate faster than the second consumption rate; and transmitting the second wake up rate to a first weight sensor of the first keg.

12. The method of claim 11, wherein the second wake up rate accelerates a wake up rate of the first keg relative to a wake up rate of the second keg.

13. The method of claim 12, wherein the second wake up rate wakes up the first weight sensor at a higher rate than the first wake up rate.

14. The method of claim 12, further comprising:
    transmitting a third wake up rate to a second weight sensor of the second keg to adjust the wake up rate of the second keg to the third wake up rate based on the determination that the first keg is being consumed at the first consumption rate, the third wake up rate slower than the second wake up rate.

15. The method of claim 11, wherein determining that the first keg is being consumed at the first consumption rate faster than the second keg at the second consumption rate comprises:
    estimating the first consumption rate of the first keg based on the first keg weight and a previous first keg weight received at a second wake up time; and
    estimating the second consumption rate of the first keg based on the first keg weight and a previous first keg weight received at the second wake up time.

16. The method of claim 11, wherein the first wake up rate is preprogrammed into a flash memory of the first weight sensor of the first keg.

17. The method of claim 11, further comprising:
    receiving the first keg weight of the first keg at a third wake up time according to the second wake up rate from the first weight sensor of the first keg.

* * * * *